US012021315B2

(12) United States Patent
Varnoosfaderani et al.

(10) Patent No.: US 12,021,315 B2
(45) Date of Patent: Jun. 25, 2024

(54) DUAL-POLARIZED RADIATING ELEMENTS FOR BASE STATION ANTENNAS HAVING BUILT-IN COMMON-MODE REJECTION FILTERS THAT BLOCK COMMON MODE RADIATION PARASITICS

(71) Applicant: CommScope Technologies LLC, Hickory, NC (US)

(72) Inventors: Mohammad Vatankhah Varnoosfaderani, Plano, TX (US); Peter J. Bisiules, LaGrange Park, IL (US)

(73) Assignee: CommScope Technologies LLC, Claremont, NC (US)

(*) Notice: Subject to any disclaimer, the term of this patent is extended or adjusted under 35 U.S.C. 154(b) by 309 days.

(21) Appl. No.: 17/552,390

(22) Filed: Dec. 16, 2021

(65) Prior Publication Data

US 2022/0109238 A1 Apr. 7, 2022

Related U.S. Application Data

(63) Continuation-in-part of application No. 17/437,362, filed as application No. PCT/US2020/023124 on Mar. 17, 2020.

(Continued)

(51) Int. Cl.
*H01Q 5/50* (2015.01)
*H01Q 1/22* (2006.01)
*H01Q 5/335* (2015.01)

(52) U.S. Cl.
CPC .......... *H01Q 5/335* (2015.01); *H01Q 1/2283* (2013.01); *H01Q 5/50* (2015.01)

(58) Field of Classification Search
CPC ......... H01Q 5/335; H01Q 5/50; H01Q 1/2283
See application file for complete search history.

(56) References Cited

U.S. PATENT DOCUMENTS 4,460,877 A * 7/1984 Sterns ...................... H01P 5/10 333/204
4,999,594 A 3/1991 Ingman
(Continued)

FOREIGN PATENT DOCUMENTS

CN 101313475 A 11/2008
CN 101836331 A 9/2010
(Continued)

OTHER PUBLICATIONS

International Search Report and Written Opinion of the International Searching Authority for International Application No. PCT/US2020/023124 (21 pages) (dated Jul. 2, 2020).
(Continued)

*Primary Examiner* — Jimmy T Vu
(74) *Attorney, Agent, or Firm* — Myers Bigel, P.A.

(57) ABSTRACT

An antenna includes a radiator that is electrically coupled to a feed stalk having a common-mode rejection (CMR) filter therein. The CMR filter is configured to suppress common mode radiation from the radiator by providing a frequency dependent impedance to a pair of common mode currents within the feed stalk, which is sufficient to increase a return loss associated with the pair of common mode currents to a level of greater than −6 dB across a frequency range including a frequency of the common mode radiation.

19 Claims, 19 Drawing Sheets

Related U.S. Application Data

(60) Provisional application No. 63/140,742, filed on Jan. 22, 2021, provisional application No. 62/822,387, filed on Mar. 22, 2019.

(56) References Cited

U.S. PATENT DOCUMENTS

| | | | |
|---|---|---|---|
| 5,179,362 | A | 1/1993 | Okochi et al. |
| 5,612,652 | A | 3/1997 | Crosby |
| 7,170,463 | B1 | 1/2007 | Seavey |
| 7,692,601 | B2 | 4/2010 | Bisiules et al. |
| 9,859,604 | B2 | 1/2018 | Huang |
| 10,840,593 | B1 | 11/2020 | Johnson et al. |
| 11,239,878 | B2 | 2/2022 | Kumar et al. |
| 11,322,827 | B2 | 5/2022 | Varnoosfaderani et al. |
| 2008/0122710 | A1 | 5/2008 | Kim et al. |
| 2009/0122847 | A1 | 5/2009 | Nysen |
| 2012/0212384 | A1 | 8/2012 | Kam et al. |
| 2015/0102962 | A1* | 4/2015 | Ellgardt ................. H01Q 25/00 342/368 |
| 2017/0294704 | A1 | 10/2017 | Sun et al. |
| 2018/0323513 | A1 | 11/2018 | Varnoosfaderani et al. |
| 2018/0331419 | A1 | 11/2018 | Varnoosfaderani et al. |
| 2022/0173507 | A1 | 6/2022 | Varnoosfaderani |

FOREIGN PATENT DOCUMENTS

| | | | |
|---|---|---|---|
| CN | 104106179 | A | 10/2014 |
| CN | 113690592 | A | 11/2021 |
| EP | 2963736 | A1 * | 1/2016 |

OTHER PUBLICATIONS

STMicroelectronics, “AN4511 Application note” (21 pages) (Jun. 2016).

* cited by examiner

72mm height

DUAL-POLARIZED RADIATING ELEMENTS FOR BASE STATION ANTENNAS HAVING BUILT-IN COMMON-MODE REJECTION FILTERS THAT BLOCK COMMON MODE RADIATION PARASITICS

REFERENCE TO PRIORITY APPLICATION

The present application claims priority to U.S. Provisional Patent Application No. 63/140,742, filed Jan. 22, 2021, and is a continuation-in-part of U.S. application Ser. No. 17/437,362, filed Sep. 8, 2021, which is a 35 U.S.C. § 371 national stage application of PCT Application No. PCT/US2020/023124, filed Mar. 17, 2020, which claims priority to U.S. Provisional Patent Application No. 62/822,387, filed Mar. 22, 2019, the disclosures of which are hereby incorporated herein by reference.

FIELD OF THE INVENTION

The present invention relates to radio communications and antenna devices and, more particularly, to dual-polarized antennas for cellular communications and methods of operating same.

BACKGROUND

Cellular communications systems are well known in the art. In a typical cellular communications system, a geographic area is often divided into a series of regions that are commonly referred to as "cells", which are served by respective base stations. Each base station may include one or more base station antennas (BSAs) that are configured to provide two-way radio frequency ("RF") communications with mobile subscribers that are within the cell served by the base station. In many cases, each base station is divided into "sectors." In perhaps the most common configuration, a hexagonally shaped cell is divided into three 120° sectors, and each sector is served by one or more base station antennas, which can have an azimuth Half Power Beam Width (HPBW) of approximately 65° to thereby provide sufficient coverage to each 120° sector. Typically, the base station antennas are mounted on a tower or other raised structure and the radiation patterns (a/k/a "antenna beams") are directed outwardly therefrom. Base station antennas are often implemented as linear or planar phased arrays of radiating elements.

Furthermore, in order to accommodate an increasing volume of cellular communications, cellular operators have added cellular service in a variety of frequency bands. While in some cases it is possible to use a single linear array of so-called "wide-band" radiating elements to provide service in multiple frequency bands, in other cases it may be necessary to use different linear arrays of radiating elements in multi-band base station antennas to support service in the additional frequency bands.

One conventional multi-band base station antenna design includes at least one linear array of relatively "low-band" radiating elements, which can be used to provide service in some or all of a 617-960 MHz frequency band, and at least two linear arrays of relatively "high-band" radiating element that are used to provide service in some or all of a 1695-2690 MHz frequency band.

A conventional box dipole radiating element may include four dipole radiators that are arranged to define a box like shape. The four dipole radiators may extend in a common plane, and may be mounted forwardly of a reflector that may extend parallel to the common plane. So called feed stalks may be used to mount the four dipole radiators forwardly from the reflector, and may be used to pass RF signals between the dipole radiators and other components of the antenna. In some of these conventional box dipole radiating elements, a total of eight feed stalks (4×2) may be provided and may connect to the box dipole radiators at the corners of the box.

For example, as illustrated by FIGS. 1A-1B, a conventional multi-band radiator 10 for a base station antenna may include a relatively high-band radiating element **10*a* centered within and surrounded on four sides by a relatively low-band radiating element 10*b*, which is configured as a box dipole radiating element ("box dipole"). RF signals may be fed to the four dipole radiators of a conventional box dipole radiator element through the feed stalks at two opposed and "excited" corners of the "box," as is shown in FIG. 1A. In response, common mode (CM) currents are forced automatically onto the two diametrically opposed non-excited corners of the box, in response to differential mode (DM) currents that are fed to the two excited "differential mode" ports. And, because these common mode currents radiate as a monopole on these "non-excited" feed stalks, the overall radiation pattern of the box dipole 10*b* is actually a combination of two dipoles and two monopoles (with "nulls"), as illustrated by the simplified radiation patterns of FIG. 1B. Unfortunately, the radiation stemming from monopole operation can be highly undesirable when designing a box dipole radiator. For example, although having common mode currents radiating at the same time with differential mode currents in the box dipole 10*b* can be expected to slightly narrow the azimuth HPBW of the box dipole 10*b* because of the presence of two nulls caused by the monopole radiators, a concurrent co-polarization radiation pattern of the box dipole 10*b*** can be expected to demonstrate rising "shoulders" in the radiation pattern, which can significantly degrade overall antenna performance.

Referring now to FIGS. 2A-2B, conventional cross-polarized box dipole radiating elements 20, 20' (with inwardly slanted feed stalks and hence slanted monopoles) are illustrated, which operate in a similar manner relative to the low-band radiating element **10*b* of FIG. 1A. Thus, as shown, the excitation of a first pair of diametrically opposite "differential mode" ports of the box dipole radiating elements 20, 20' can induce common mode (CM) currents in a corresponding second pair of ports, which results in monopole-type radiation from a pair of slanted monopoles. And, as further shown by FIG. 2A, this monopole-type radiation can result in the generation of undesired "shoulders" (S) in an azimuth radiation pattern associated with the box dipole 20**.

SUMMARY

Dual-polarized radiating elements for base station antennas (BSAs) may utilize stalk-based filters to suppress common mode radiation parasitics. According to some embodiments of the invention, an antenna radiating element is provided with first and second radiator arms, which may be supported in front of a substrate by a feed stalk. This feed stalk includes a first feed path electrically coupled to the first radiator arm, a second feed path electrically coupled to the second radiator arm, and a common-mode rejection filter having first and second ports electrically connected to the first and second feed paths, respectively. This common-mode rejection filter includes a pair of coupled inductors therein. In some embodiments of the invention, the pair of coupled inductors may be disposed intermediate a base and distal end of the feed stalk.

The pair of coupled inductors includes: (i) a first inductor having a current carrying terminal electrically coupled to the first port of the common-mode rejection filter, and (ii) a second inductor having a current carrying terminal electrically coupled to the second port of the common-mode rejection filter. The feed stalk may also be configured as a printed circuit board having patterned metallization on first and second opposing sides thereof, and the pair of coupled inductors may be defined by the patterned metallization on the first and second opposing sides of the printed circuit board. In addition, the first feed path may be electrically connected to the first of the pair of coupled inductors, and the second feed path may be electrically connected by a plated through-hole in the printed circuit board to the second of the pair of coupled inductors.

According to additional embodiments of the invention, the common-mode rejection filter is configured so that a first impedance electrically coupled to the first port is equivalent to $Z_1$, and a second impedance electrically coupled to the second port is equivalent to $Z_2$, where: $Z_1=R_1+j\omega L_1+j\omega M(I_2/I_1)$; $Z_2=R_2+j\omega L_2+j\omega M(I_1/I_2)$; $R_1$ and $R_2$ are the resistances of the first inductor and the second inductor, respectively; $L_1$ and $L_2$ are the inductances of the first inductor and the second inductor, respectively; M is a mutual inductance between the first and second inductors; $I_1$ and $I_2$ are the first and second currents into the first and second ports, respectively; and ω is the angular frequency of the first and second currents. These impedances $Z_1$ and $Z_2$ are configured to block common mode signals with high frequency-dependent reactances when $I_1$ equals $I_2$, but selectively and efficiently pass differential mode signals with a very low resistance when $I_1$ equals $-I_2$.

In further embodiments of the invention, the antenna is configured as a box dipole antenna having first through fourth feed ports that communicate with respective first through fourth corners of the box dipole. A first feed port is provided at a first corner, and is electrically coupled by the common-mode rejection filter to the first and second feed paths. In other embodiments of the invention, the antenna is configured as a loop antenna having at least a first feed port, which is electrically coupled by the common-mode rejection filter to the first and second feed paths.

According to additional embodiments of the invention, a box dipole antenna is provided, which includes a first dipole radiator having first and second dipole arms electrically coupled to respective first and second ports of a first common-mode rejection filter. The first common-mode rejection filter is configured so that a first impedance therein, which is electrically coupled to the first port, is equivalent to $Z_1$, and a second impedance therein, which is electrically coupled to the second port, is equivalent to $Z_2$, where: $Z_1=R_1+j\omega L_1+j\omega M(I_2/I_1)$; $Z_2=R_2+j\omega L_2+j\omega M(I_1/I_2)$; $R_1$ and $R_2$ are the resistances of a first inductor and a second inductor, respectively; $L_1$ and $L_2$ are the inductances of the first inductor and the second inductor, respectively; M is a mutual inductance between the first and second inductors; $I_1$ and $I_2$ are the first and second currents into the first and second ports, respectively; and ω is the angular frequency of the first and second currents. In addition, the first common-mode rejection filter may be integrated into a first feed stalk, which is: (i) electrically coupled to a first end of the first dipole arm and a first end of the second dipole arm, and (ii) supports the first dipole radiator in front of a substrate, such as a ground plane reflector of a base station antenna.

According to still further embodiments of the invention, an antenna is provided, which includes a radiator (e.g., loop, box dipole, etc.) and a feed stalk. This feed stalk, which is electrically coupled by first and second feed paths to the radiator, includes a common-mode rejection filter having first and second ports electrically connected to the first and second feed paths, respectively. In some of these embodiments of the invention, the common-mode rejection filter includes a pair of coupled inductors therein, which may be disposed intermediate a base and a distal end of the feed stalk. This pair of inductors includes a first inductor having a first current carrying terminal electrically coupled to the first port of the common-mode rejection filter, and a second inductor having a first current carrying terminal electrically coupled to the second port of the common-mode rejection filter.

In some of these embodiments of the invention, the feed stalk may include a printed circuit board having patterned metallization on first and second opposing sides thereof, and the pair of coupled inductors may be at least partially defined by the patterned metallization on the first and second opposing sides of the printed circuit board. In addition, the first feed path may be electrically connected to the first of the pair of coupled inductors, whereas the second feed path may be electrically connected by a plated through-hole in the printed circuit board to the second of the pair of coupled inductors.

An antenna according to another embodiment of the invention includes a radiator, and a feed stalk having a common-mode rejection (CMR) filter embedded therein. In some of these embodiments, the radiator includes first and second radiating arms (e.g., dipole arms), which are electrically coupled to respective first and second ports of the common-mode rejection filter. This common-mode rejection filter, which is located within a feed signal path of the antenna, is configured so that a first impedance therein is equivalent to $Z_1$ and a second impedance therein is equivalent to $Z_2$. The first impedance is electrically coupled to the first port and the second impedance is electrically coupled to the second port. According to these embodiments: $Z_1=R_1+j\omega L_1+j\omega M(I_2/I_1)$; $Z_2=R_2+j\omega L_2+j\omega M(I_1/I_2)$; $L_1\approx L_2$; $R_1$ and $R_2$ are the resistances of a first inductor and a second inductor, respectively; $L_1$ and $L_2$ are the inductances of the first inductor and the second inductor, respectively; M is a mutual inductance between the first and second inductors; $I_1$ and $I_2$ are the first and second common mode currents into the first and second ports, respectively; the expression "≈" designates an equality within ±10%; ω is the angular frequency of the first and second common mode currents; and M is sufficiently close in magnitude to $L_1$ and $L_2$ that a return loss associated with the first and second common mode currents is greater than −6 dB at the angular frequency ω.

According to some of these embodiments of the invention, the feed signal path includes a dual-sided printed circuit board (PCB) having a hook-shaped feed line on a first surface thereof. The first and second inductors may also be patterned as spiral inductors on a second surface of the PCB. And, these spiral inductors may be configured as mirror-images of each other about a centerline of the PCB, which the hook-shaped feed line may cross. In some embodiments, the PCB includes a first plated through-hole, which electrically connects a first end of the first inductor to a first metallization pattern on the first surface of the PCB, and a second plated through-hole, which electrically connects a first end of the second inductor to a second metallization pattern on the first surface of the PCB. Based on this configuration of the PCB, the first radiating arm of the radiator may be electrically coupled by the first metallization pattern to the first port of the common-mode rejection filter, and the second radiating arm of the radiator may be electrically coupled by the second metallization pattern to the second port of the common-mode rejection filter. In addition, a second end of the first inductor may be electrically connected to a third metallization pattern, which covers a majority of a first half of the second surface of the PCB, and a second end of the second inductor may be electrically connected to a fourth metallization pattern, which covers a majority of a second half of the second surface of the PCB.

In still further embodiments of the invention, an antenna is provided that includes a radiator having first and second radiating arms, and a feed stalk having a common-mode rejection (CMR) filter therein. This CMR filter is configured so that a first impedance therein, which is electrically coupled to the first radiating arm, is equivalent to $Z_1$, and a second impedance therein, which is electrically coupled to the second radiating arm, is equivalent to $Z_2$. According to this embodiment, $Z_1=R_1+j\omega L_1+j\omega M(I_2/I_1)$, and $Z_2=R_2+j\omega L_2+j\omega M(I_1/I_2)$, where: $R_1$ and $R_2$ are the resistances of a first inductor and a second inductor, respectively; $L_1$ and $L_2$ are the inductances of the first inductor and the second inductor, respectively, and $L_1 \approx L_2$; M is a mutual inductance between the first and second inductors; $I_1$ and $I_2$ are the first and second common mode currents in the first impedance and the second impedance, respectively; ω is the angular frequency of the first and second common mode currents; and the expression "≈" designates an equality within ±25%.

In these embodiments, the first and second inductors may be spiral inductors, which are configured as mirror images of each other about a centerline of the feed stalk. In addition, a first end of the first inductor is electrically connected to a first plated through-hole within the feed stalk, which extends between the first end of the first inductor and the first radiating arm, and a first end of the second inductor is electrically connected to a second plated through-hole within the feed stalk, which extends between the first end of the second inductor and the second radiating arm. The feed stalk may also be configured as a dual-sided printed circuit board having a hook-shaped feed line on a first surface thereof. The first and second inductors may also be patterned as spiral inductors on a second surface of the printed circuit board. Preferably, the mutual inductance M is sufficiently close in magnitude to $L_1$ and $L_2$ that a return loss associated with the first and second common mode currents is greater than −6 dB at the angular frequency ω.

DETAILED DESCRIPTION OF EMBODIMENTS

Figure 1A:
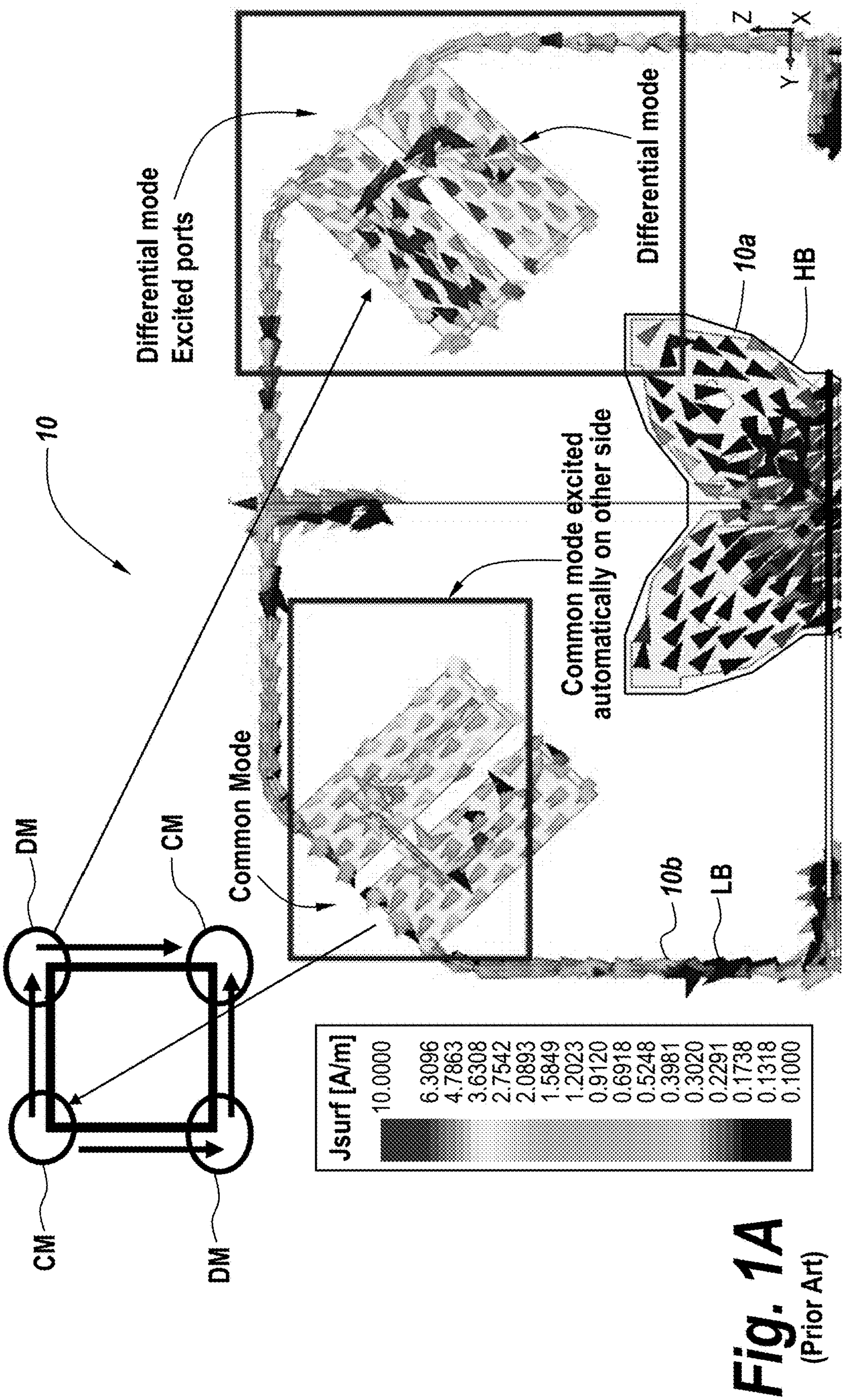
Fig. 1A (Prior Art)
FIG. 1A is a schematic diagram of a multi-band radiator including a high-band radiating element surrounded by a low-band box dipole radiating element, showing simulated differential mode and common mode currents therein, according to the prior art.
Figure 1B:
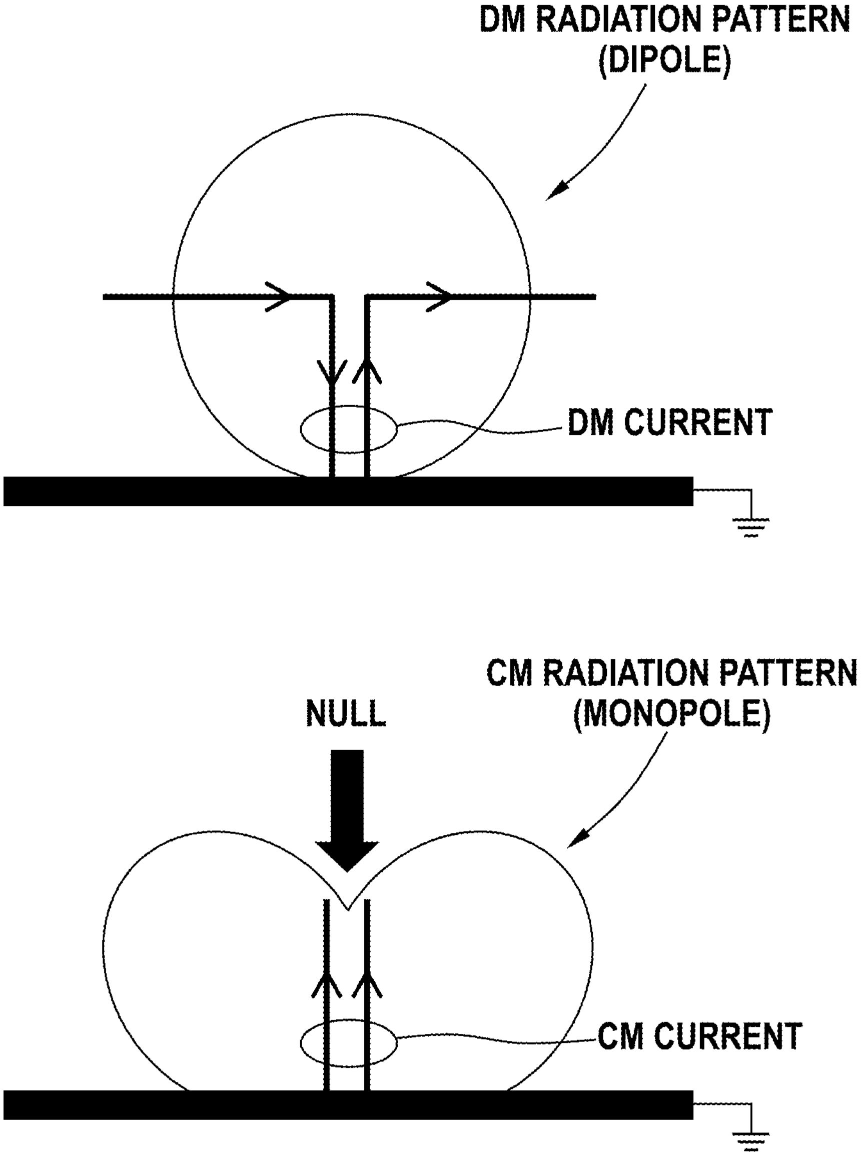
Fig. 1B (Prior Art)
FIG. 1B illustrates differential mode (DM) and common mode (CM) radiation patterns for a box dipole antenna, according to the prior art.
Figure 2A:
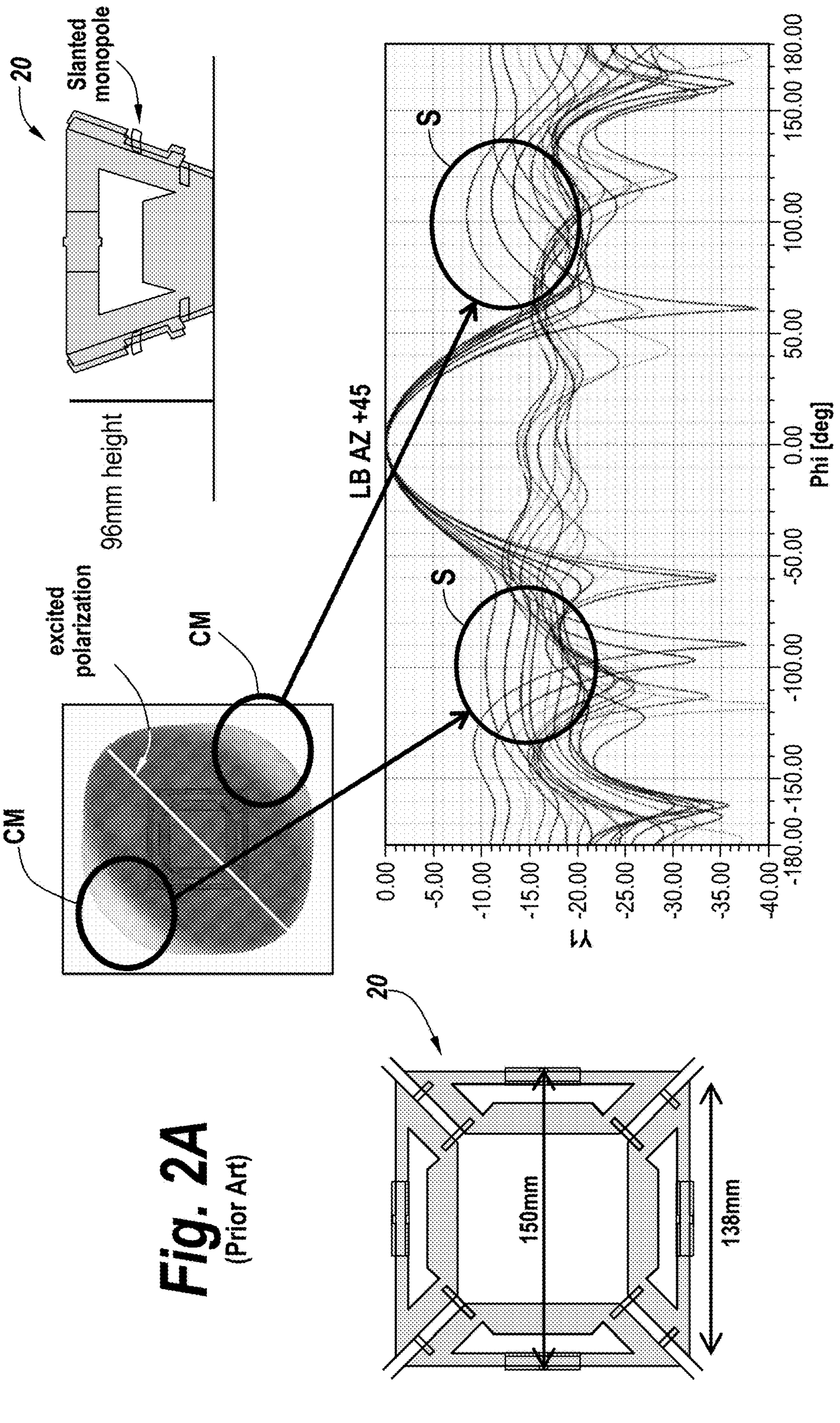
Fig. 2A (Prior Art)
FIG. 2A illustrates a conventional box dipole radiating element with slanted monopoles, and a simulated azimuth radiation pattern having undesired shoulders.
Figure 2B:
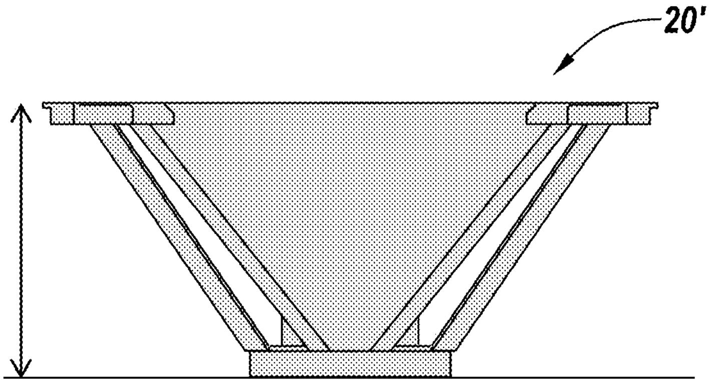
Fig. 2B (Prior Art)
FIG. 2B illustrates a conventional sheet metal box dipole radiating element with slanted monopoles, and a simulated radiation pattern that highlights undesired shoulders.
Figure 2B:
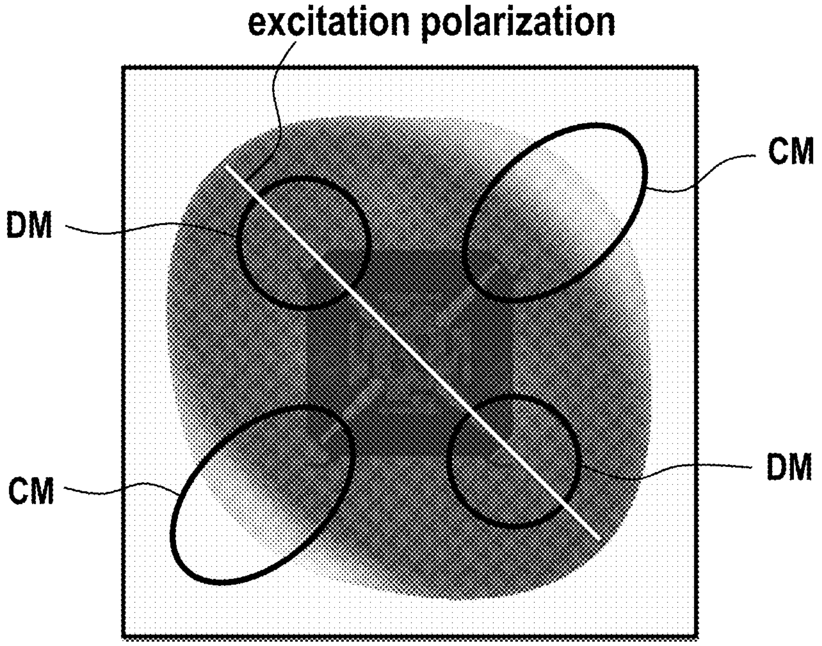
Fig. 2B (Prior Art)

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art.

Like reference numerals refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes any and all combinations of one or more of the associated listed items.

It will be understood that when an element is referred to as being “on” another element, it can be directly on the other element or intervening elements may also be present. In contrast, when an element is referred to as being “directly on” another element, there are no intervening elements present. It will also be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between”, “adjacent” versus “directly adjacent”, etc.).

Relative terms such as “below” or “above” or “upper” or “lower” or “horizontal” or “vertical” may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises,” “comprising,” “includes” and/or “including” specify the presence of stated features, operations, elements, and/or components, but do not preclude the presence or addition of one or more other features, operations, elements, components, and/or groups thereof.

Aspects and elements of all of the embodiments disclosed hereinbelow can be combined in any way and/or combination with aspects or elements of other embodiments to provide a plurality of additional embodiments.

Figure 3A:
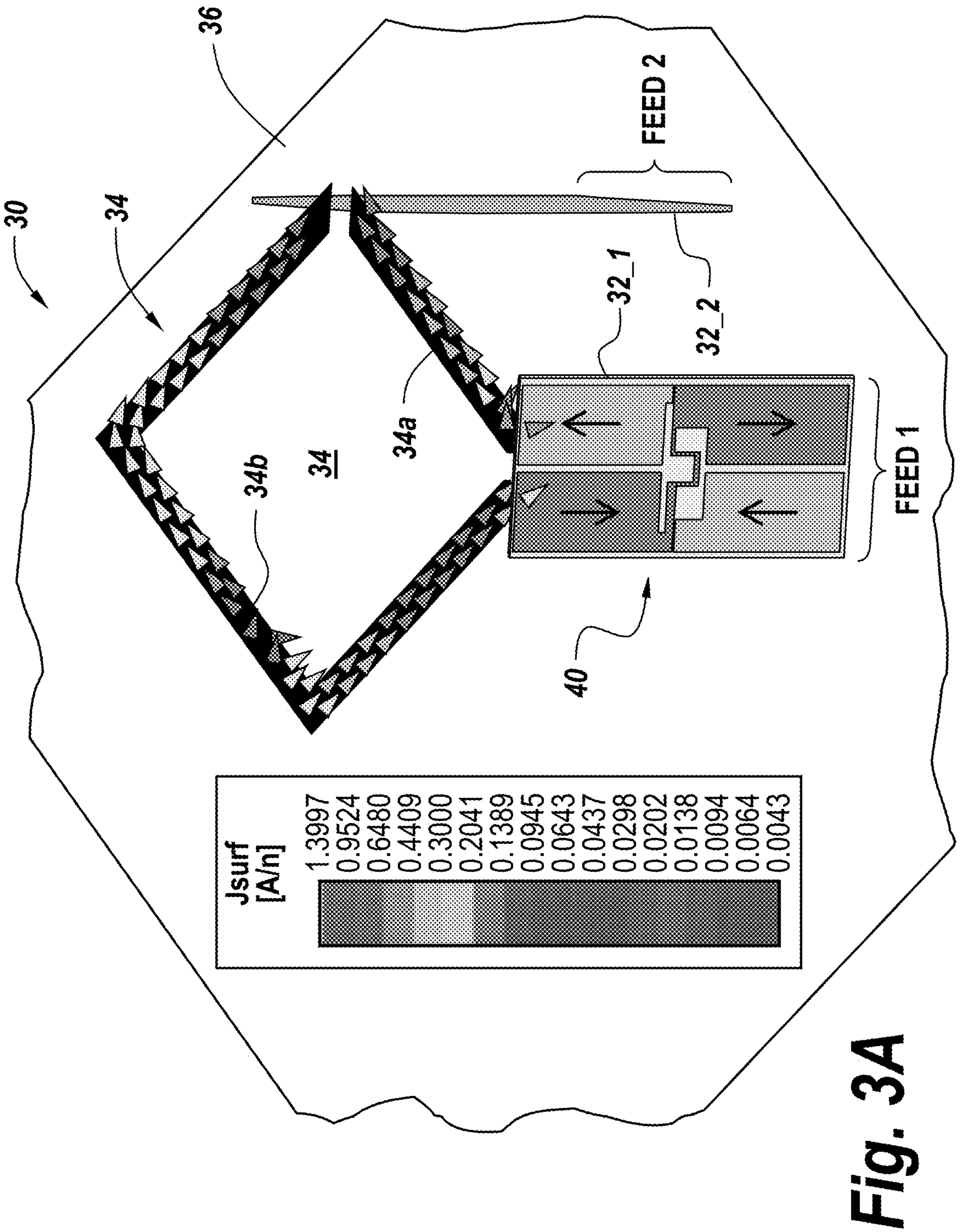
FIG. 3A is perspective view of a loop antenna with feed stalks containing common-mode rejection filters, according to an embodiment of the present invention.

Referring now to FIG. 3A, an antenna 30 according to an embodiment of the invention is illustrated as including a shared single-sided radiator segment 34*a* and a shared three-sided radiator segment 34*b*, which extend along four sides of a rectangular (e.g., square) loop 34. As shown, this rectangular loop 34 is supported in front of a reflector surface 36, such as a ground plane, by a pair of “dual-path” feed stalks 32_1, 32_2. These feed stalks 32_1, 322, which are each electrically coupled to respective ends of the radiator segments 34*a*, 34*b*, enable operation of the rectangular loop 34 as a cross-polarized loop antenna. For example, when operating as an RF transmitter, the rectangular loop 34 is responsive to first and second “outgoing” radio frequency (RF) signals, which are provided to first and second feed ports FEED1, FEED2 at the base of the feed stalks 32_1, 32_2. Alternatively, when operating as a receiver of RF signals, the rectangular loop 34 receives and passes relatively low energy RF signals to the feed stalks 32_1, 32_2, which are electrically coupled at the first and second feed ports FEED1, FEED2 to low noise amplification and receiver circuitry (not shown). In some embodiments of the invention, the rectangular loop 34 may be a relatively small square loop with each side spanning about % of the wavelength for the operating frequency of the antenna.

Figure 3B:
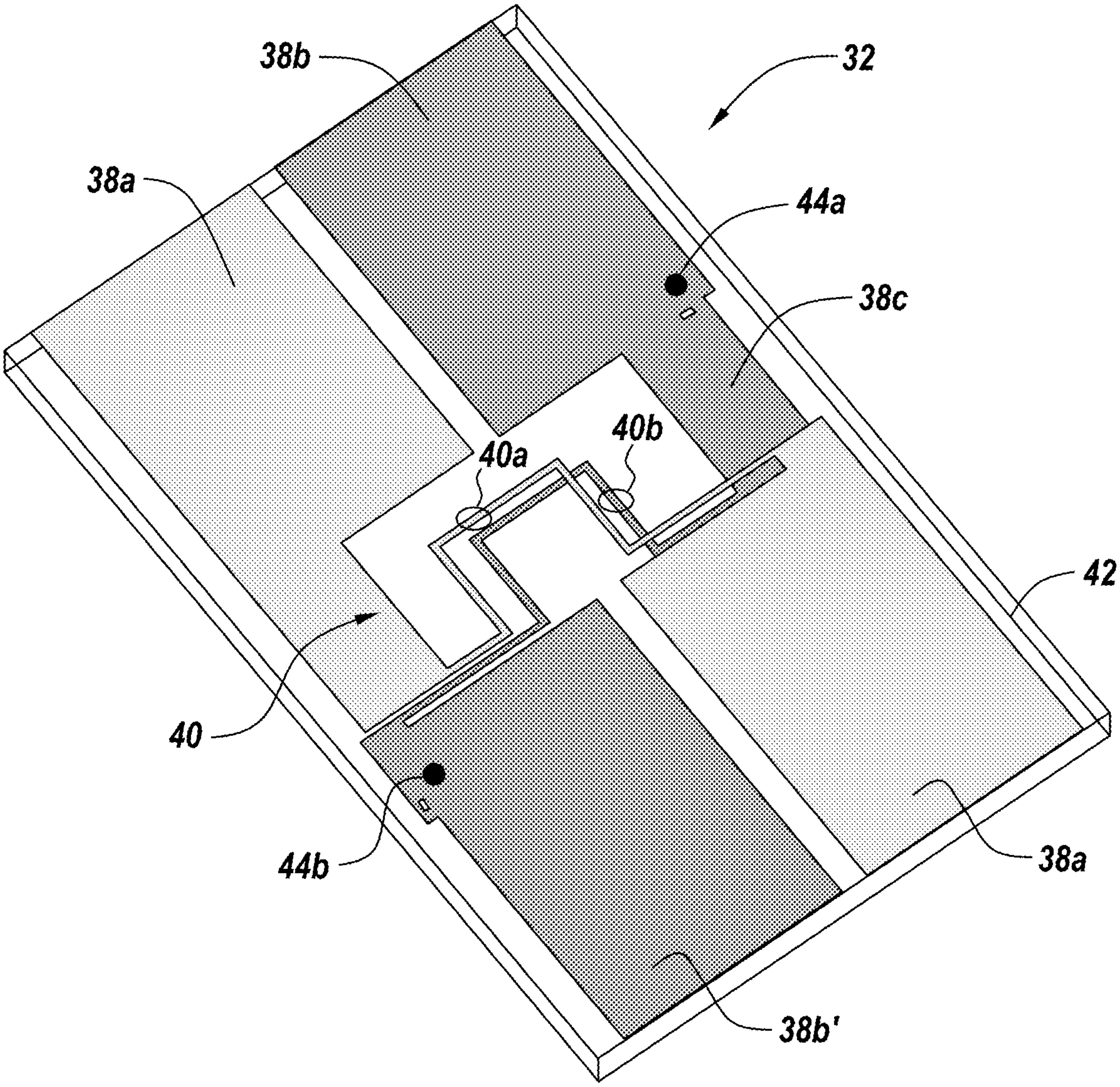
FIG. 3B is a perspective view of a feed stalk including a multi-layer printed circuit board (PCB), according to an embodiment of the present invention.

Referring now to FIGS. 3B-3F, each of the feed stalks 32_1, 32_2 utilized by the loop antenna of FIG. 3A may be configured as identical multi-layer printed circuit board (PCB) feed stalks 32. However, in alternative embodiments of the invention, it may be advantageous (e.g., for isolation or pattern tuning purposes) to have feed stalks with different impedances to thereby support unbalanced polarizations. In particular, and as shown by FIG. 3B, the feed stalk 32 may include a dielectric (i.e., non-conductive) board substrate 42 having patterned metallization on first and second opposing sides thereof. On the first side, a first electrically conductive path 38*a* is provided, which includes a continuous metallization path that extends from one corner at a first “distal” end of the substrate 42 to a diametrically opposite corner on a second end (e.g., base) of the substrate 42, as illustrated. In addition, a second electrically conductive path is defined by patterned metal segments 38*b*, 38*b*' and 38*c* and a pair of electrically conductive (e.g., plated) through-holes 44*a*, 44*b*, which electrically connect “intermediate” segment 38*c* to respective segments 38*b* and 38*b'*.

Figure 3C:
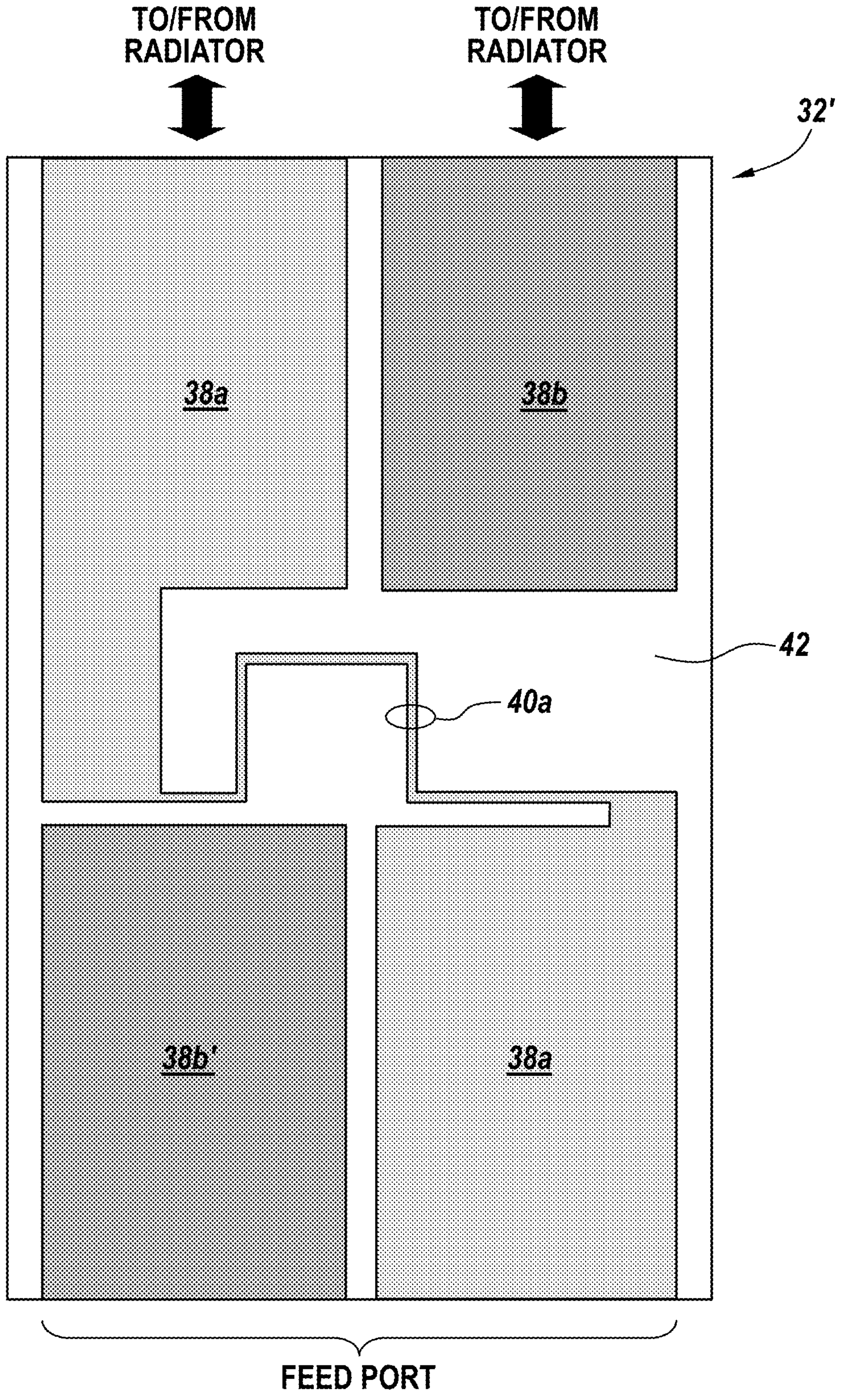
FIG. 3C is a front view of the feed stalk of FIG. 3B, which illustrates patterned metallization on a front side of a printed circuit board, according to an embodiment of the invention.
Figure 3D:
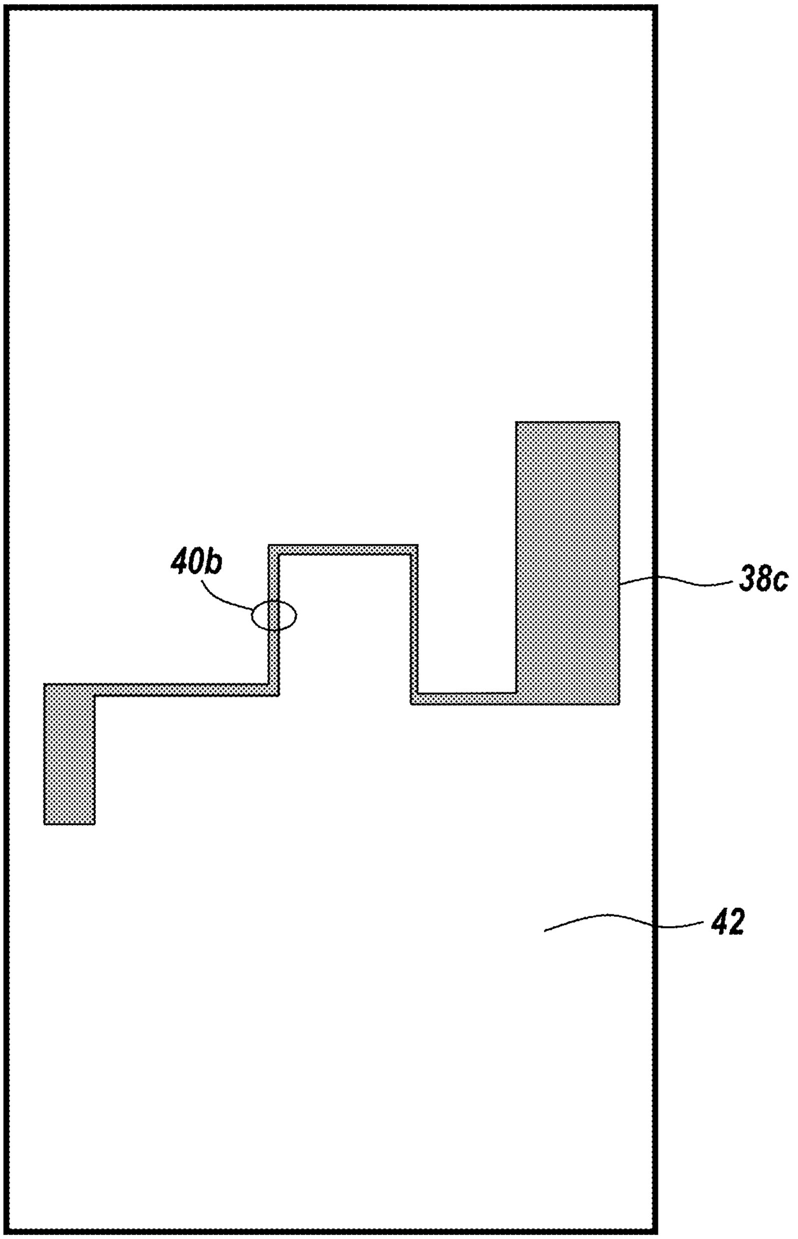
FIG. 3D is a front view of the feed stalk of FIG. 3B, but will all patterned metallization on the front side of the printed circuit board removed and only patterned metallization on a rear side of the printed circuit board visible (looking through the PCB), according to an embodiment of the present invention.
Figure 3E:
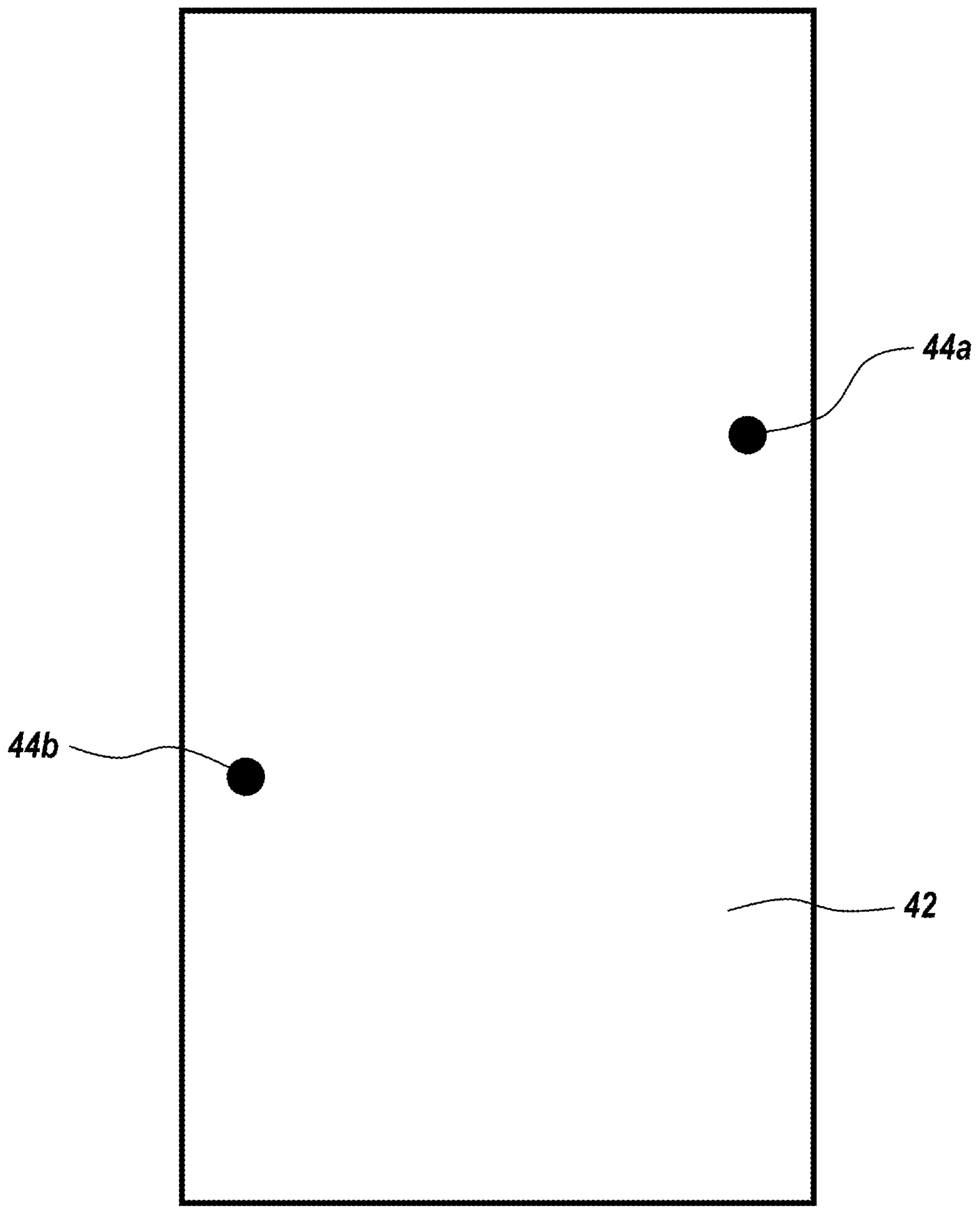
FIG. 3E is a front view of the printed circuit board of the feed stalk of FIG. 3B, which reveals a pair of plated through-holes, according to an embodiment of the present invention.

As shown more fully by FIGS. 3C-3E, a first side 32' of the feed stalk 32 includes a serpentine-shaped inductor 40*a*, which extends in series within the first electrically conductive path 38*a* (without interruption) and at a location intermediate the ends of the substrate 42, as shown. In addition, the patterned metal segments 38*b*, 38*b*' on the first side 32' of the feed stalk 32, the two plated through-holes 44*a*, 44*b*, and the patterned metal segment 38*c* on the second side 32" of the feed stalk 32, which includes a serpentine-shaped inductor 40*b* therein, collectively define a second electrically conductive path that extends between diametrically opposite corners of the feed stalk 32, as shown. According to alternative embodiments of the invention, the first and second electrically conductive paths (including inductors 40*a*, 40*b*) may be provided in the absence of a dielectric board substrate.

As will now be described more fully with respect to FIGS. 3B and 3F, the first and second serpentine-shaped inductors 40*a*, 40*b*, which extend on opposing first and second sides of the printed circuit board substrate 42, collectively define a common-mode rejection (CMR) filter 40 that selectively and advantageously blocks common mode currents $I_{CM}$ from passing from a feed port at the base of a feed stalk 32 to the radiator segments 34*a*, 34*b* within the rectangular loop 34, which are mounted to a distal end of the feed stalk 32 and electrically connected to respective ones of the first electrically conductive path 38*a* and patterned metal segment 38*b* at the distal end. For example, with respect to the first feed port (FEED1) illustrated by FIG. 3A, the CMR filter 40 blocks a common mode current $I_{CM}$ from passing to a distal portion of the first feed path 38*a*, which is directly connected to the three-sided radiator segment 34*b*, and blocks a common mode current $I_{CM}$ from passing to a distal portion of the second feed path 38*b*, which is directly connected to the one-sided radiator segment 34*a*. Likewise, with respect to the second feed port (FEED2), the CMR filter 40 blocks a common mode current $I_{CM}$ from passing to a distal portion of the first feed path 38*a*, which is directly connected to the one-sided radiator segment 34*a*, and blocks a common mode current $I_{CM}$ from passing to a distal portion of the second feed path 38*b*, which is directly connected to the three-sided radiator segment 34*b*.

These preferential RF "blocking" characteristics of the CMR filter 40 can be best understood by considering how a specific mutual inductance M between the overlapping serpentine-shaped inductors 40*a*, 40*b*, which are separated by a PCB substrate 42 having a predetermined thickness, can be designed to block common mode currents at a first RF frequency, yet selectively pass (with very low attenuation) differential-mode currents at the same RF frequency.

Although not wishing to be bound by any theory, the first inductor 40*a* on the first side 32' of the substrate 42 may be treated as having an impedance $Z_1$, and the second inductor 40*b* on the second side 32" of the substrate 42 may be treated as having an impedance $Z_2$, where:

$$Z_1=R_1+j\omega L_1+j\omega M(I_2/I_1);\text{ and}$$

$$Z_2=R_2+j\omega L_2+j\omega M(I_1/I_2).$$

In these equations, $R_1$ and $R_2$ are the resistances of the first inductor 40*a* and the second inductor 40*b*, respectively; $L_1$ and $L_2$ are the inductances of the first inductor 40*a* and the second inductor 40*b*, respectively; M is a mutual inductance between the overlapping first and second inductors 40*a*, 40*b*, which are separated from each other by the electrically insulating PCB substrate 42; $I_1$ and $I_2$ are the first and second currents into the first and second ports (1) and (2) of the filter 40, respectively; and ω is the angular frequency of the first and second currents. As shown by FIG. 3F, a first differential mode current $I1_{DM}$, which passes from a distal portion of the first feed path 38*a* to a base of the first feed path 38*a* at the feed port, is treated herein as equivalent to $I_1$, whereas $I2_{DM}$, which passes from a base portion (metal segment 38*b*') of the second feed path (at the feed port) to a distal portion (metal segment 38*b*) of the second feed path, is treated herein as equivalent to $-I_2$.

Figure 3F:
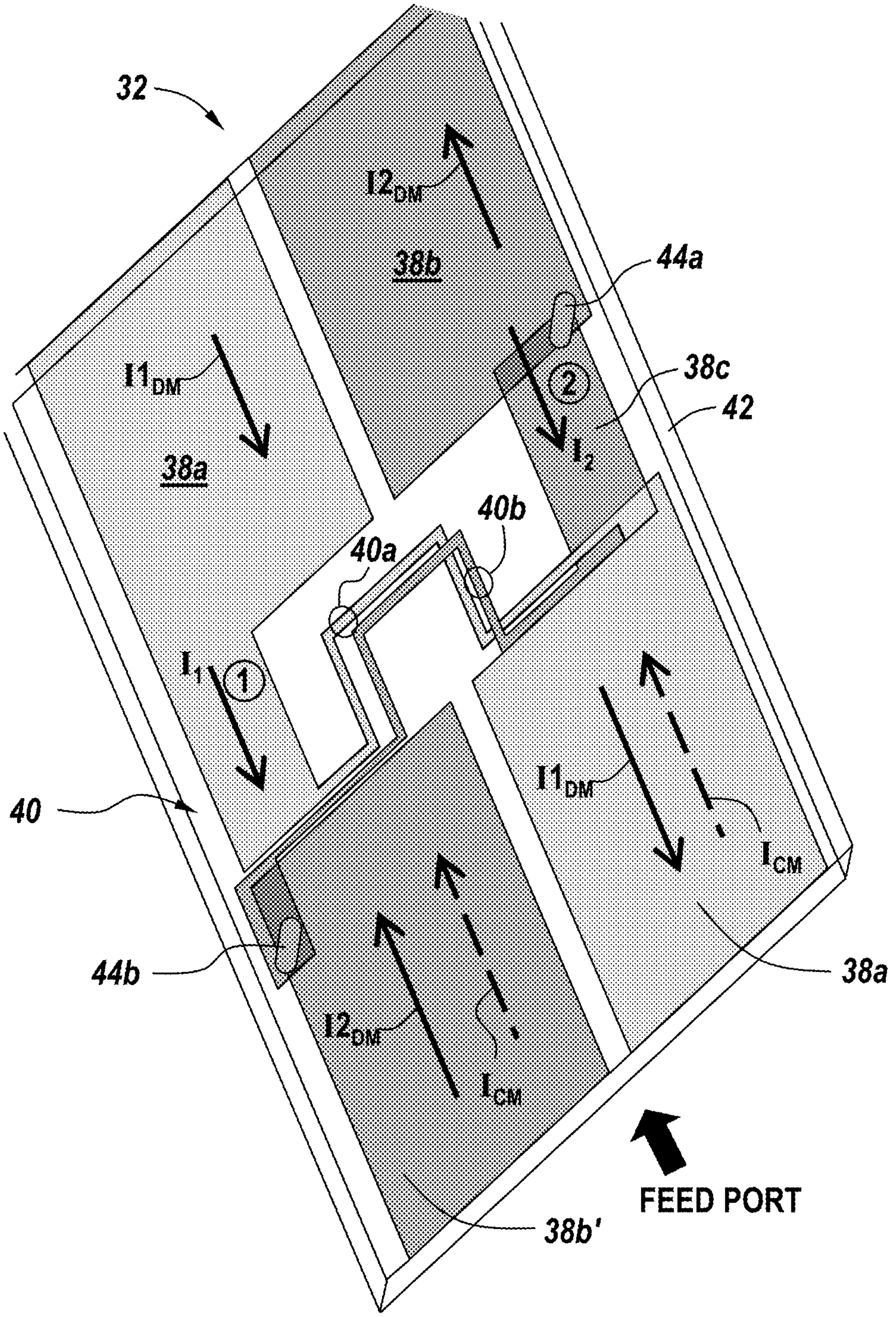
FIG. 3F is a perspective view of the feed stalk of FIG. 3B, but assuming a transparent printed circuit board for purposes of illustration so that current paths associated with the common-mode rejection filter can be illustrated, according to an embodiment of the invention.

By carefully designing/tuning the inductors $L_1$ and $L_2$ (and their coupling) to be equivalent to each other and equivalent to the mutual inductance M between them (i.e., $L_1 \approx L_2 = M$, where the expression "≈" designates an equality within +10%), and assuming $I_2=-I_1$ with respect to the differential mode currents $I1_{DM}$ and $I2_{DM}$ shown in FIG. 3F, then the impedances of the first and second inductors 40*a*, 40*b* may be treated as equivalent to:

$$Z_1=R_1+j\omega(L_1-M)\approx R_1;\text{ and}$$

$$Z_2=R_2+j\omega(L_2-M)\approx R_2.$$

Thus, because $Z_1 \approx R_1$ and $Z_2 = R_2$, the common-mode rejection filter 40 presents a low resistive impedance to differential mode current, and this low impedance is equal to the DC resistance of the inductors $L_1$ and $L_2$. However, assuming $I_2=I_1$ with respect to the common mode currents $I_{CM}$ shown in FIG. 3F, then the impedances of the first and second inductors 40*a*, 40*b* present a high (and frequency dependent) inductive impedance at common mode to thereby block common mode currents, where:

$$Z_1=R_1+j\omega(L_1+M)\approx R_1+j\omega\times 2L;\text{ and}$$

$$Z_2=R_2+j\omega(L_2+M)\approx R_2+j\omega\times 2L.$$

Accordingly, the stalk-based common-mode rejection filter 40 may be utilized advantageously to block common mode currents from passing through the feed stalks 32_1 and 32_2 and thereby inhibit monopole-type radiation from the loop radiator 34 of FIG. 3A, which might otherwise occur on these feed stalks.

Figure 4:
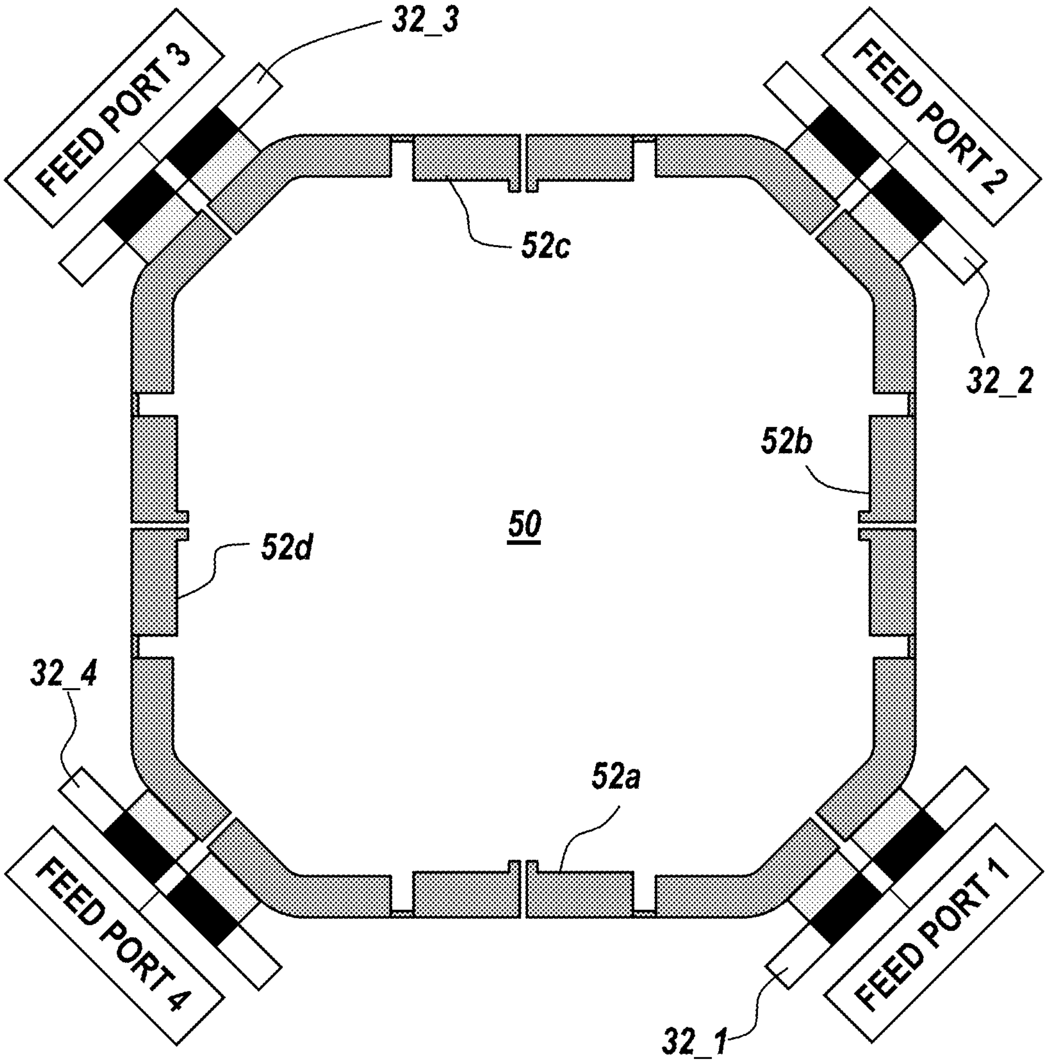
FIG. 4 is a top-down plan view of a box dipole antenna that utilizes four of the feed stalks of FIGS. 3B-3F, according to an embodiment of the present invention.

According to further embodiments of the invention, the feed stalk 32 and common-mode rejection filter 40 described hereinabove may be applied to many other antenna designs that may benefit from monopole-type radiation suppression resulting from the generation of common-mode currents within radiating elements. For example, as illustrated by FIG. 4, a box dipole antenna 50 (e.g., sheet metal box dipole antenna) may be provided having four "shared" dipole radiating elements 52*a*-52*d*, which collectively form four dipole radiators. A first dipole radiator is defined by radiating elements 52*a*, 52*b*, which are electrically coupled to a first feed stalk 32_1 and first feed port coupled to a base of the first feed stalk 32_1, as illustrated by FIGS. 3B-3F. Similarly, a second dipole radiator is defined by radiating elements 52*b*, 52*c*, which are electrically coupled to a second feed stalk 32_2 and a second feed port. A third dipole radiator is defined by radiating elements 52*c*, 52*d*, which are electrically coupled to a third feed stalk 32_3 and a third feed port. Finally, a fourth dipole radiator is defined by radiating elements 52*d*, 52*a*, which are electrically coupled to a fourth feed stalk 32_4 and a fourth feed port. As described hereinabove with respect to the "loop" antenna 30 of FIGS. 3A-3F, the first through fourth feed stalks 32_1 through 32_4 will enable differential mode operation on each excited port of the box dipole antenna 50, yet efficiently block common mode currents (and corresponding monopole radiation) on ports associated with an opposite polarization relative to each excited port. And, according to other embodiments of the invention, the feed stalks described hereinabove may be applied to rectangular-shaped box dipole antennas, and antennas with dipole radiating elements having unequal lengths and/or spacing therebetween. In addition, the feed stalks and inductively-coupled feed paths described herein can be used advantageously in many antenna designs in which a differential mode signal is desired and a common mode signal is not desired such as, but not limited to, dipole-type antennas.

Referring now to 5A, a multi-band base station antenna 100*a* is illustrated as including six (6) columns of radiating elements, which are mounted on a forward-facing surface of a ground plane reflector 102. These six columns include: (i) two innermost columns of radiating elements 104, which may be configured to operate in a relatively high first frequency band (e.g., 1695-2690 MHz), (ii) two outermost columns of radiating elements 106, which may be configured to operate in a relatively high second frequency band (e.g., 1427-2690 MHz), and (iii) two intermediate columns of larger radiating elements 108, which may be configured to operate in a lower third frequency band (e.g., 696-960 MHz).

Figure 5B:
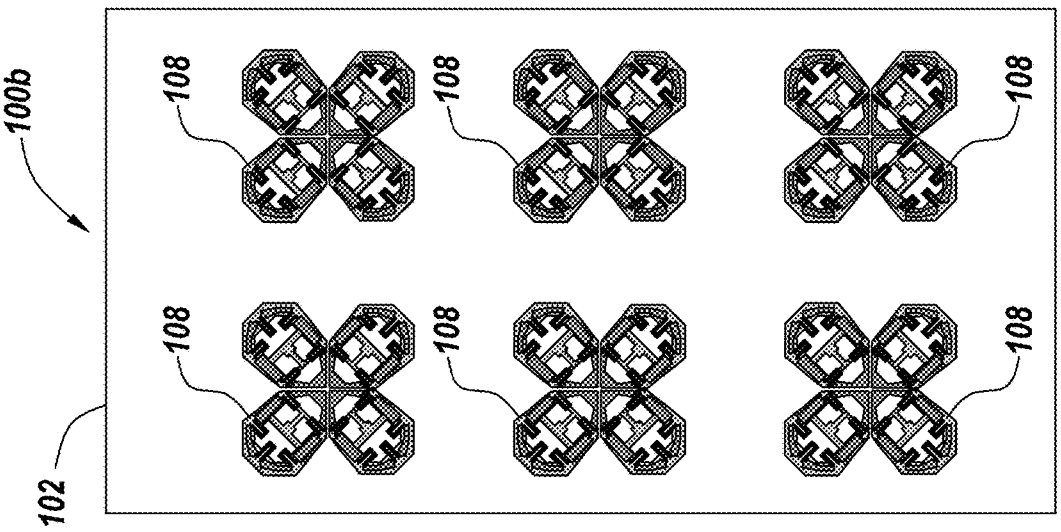
FIG. 5B is a plan view of a single-band antenna containing the first and second intermediate columns of third cross-polarized dipole radiating elements of FIG. 5A.
Figure 5A:
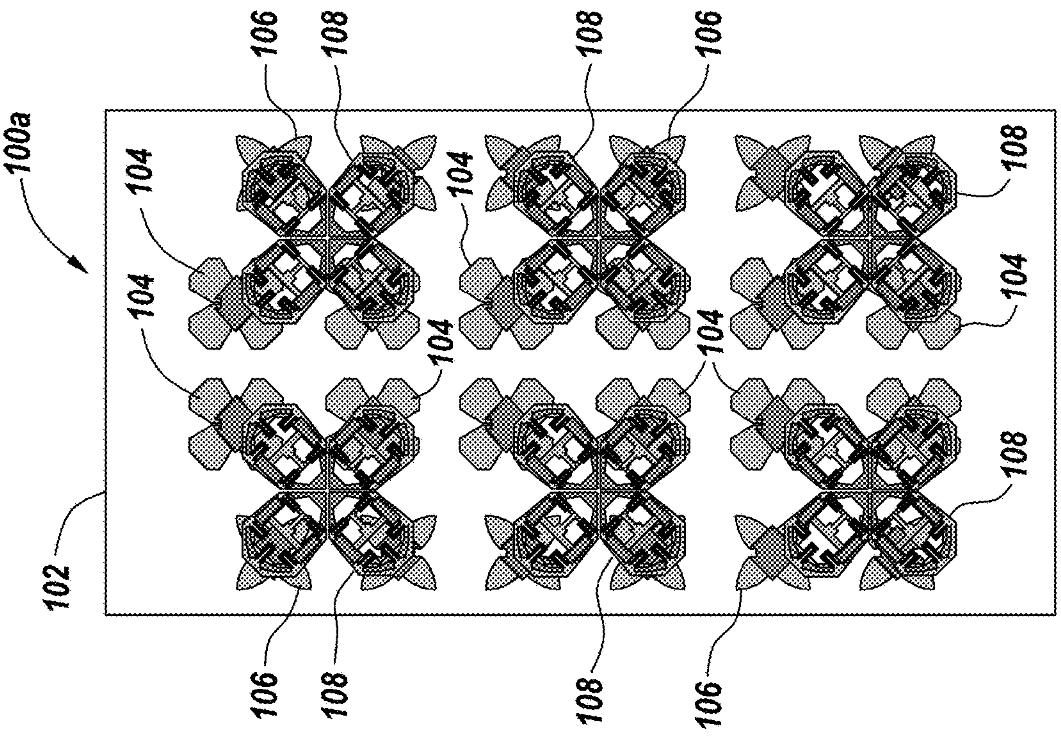
FIG. 5A is a plan view of a multi-band antenna containing: (i) first and second outermost columns of first cross-polarized dipole radiating elements configured to operate in a first frequency band, (ii) first and second innermost columns of second cross-polarized dipole radiating elements configured to operate in a second frequency band, and (iii) first and second intermediate columns of third cross-polarized dipole radiating elements configured to operate in a third frequency band, which is lower than the first and second frequency bands.

As shown by the plan view of FIG. 5A, each of the three types of radiating elements 104, 106 and 108 is configured as a corresponding dipole radiating element having two pairs of cross-polarized (e.g., −45°, +45°) radiating arms, which are supported in front of the reflector 102 by respective pairs of feed stalks. Moreover, to achieve a high degree of integration within the base station antenna 100*a*, the smaller relatively high band radiating elements 104, 106 utilize shorter feed stalks, which allow for a nesting of these elements 104, 106 between the reflector 102 and the rear-facing surfaces of the larger radiating arms associated with the intermediate columns of radiating elements 108.

Unfortunately, this nesting of relatively high band (HB) radiating elements 104, 106 in close proximity to relatively low band (LB) radiating elements 108 can cause unacceptable interference between the HB elements and the LB elements, which stems from "induced" common mode resonance within the HB elements that is derived indirectly from differential mode radiation from the LB elements, which is responsive to feed signals provided to the LB elements. Although not wishing to be bound by any theory, HB elements are generally shorter than LB elements and their height may be equivalent to % A of a frequency within a high end of the frequency band of the LB elements. As will be understood by those skilled in the art, this "common mode" interference can cause a large and unacceptable increase in the beamwidth of the LB elements, and a worsening of gain and front-to-back ratio. Moreover, the use of conventional common mode filter techniques within an HB element typically does not preclude the need to achieve a proper tradeoff between matching within the HB element and pushing any common mode resonance out of the frequency range of the LB element.

Figure 5C:
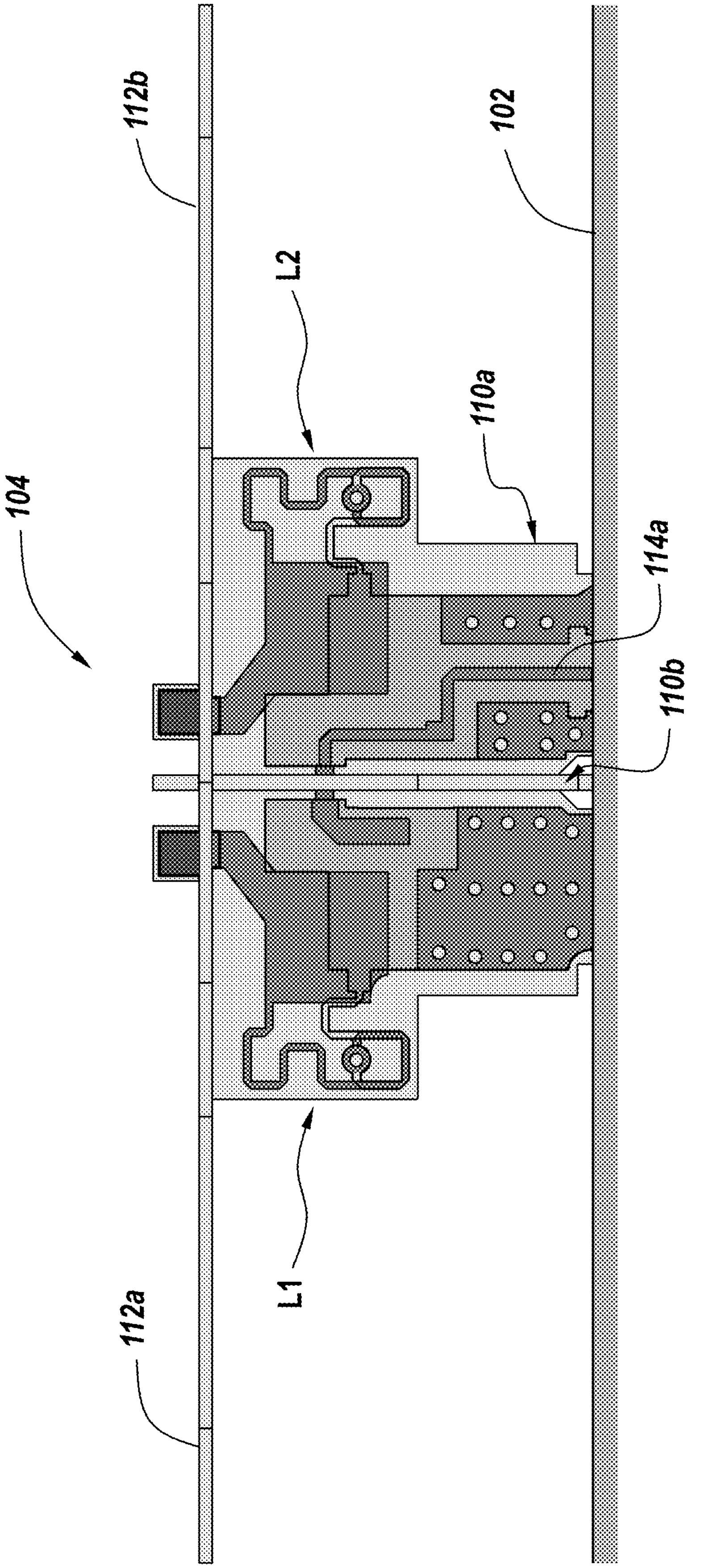
Fig. 5C (Prior Art)
FIG. 5C is a side view of one of the second cross-polarized dipole radiating elements of FIG. 5A.

One example of a conventional HB element 104, which may be configured to operate in the relatively high first frequency band, is illustrated by FIG. 5C. As shown, a pair of orthogonally interconnected first and second feed stalks 110*a*, 110*b* are provided, which are electrically coupled to corresponding pairs of radiating arms. In FIG. 5C, the first feed stalk 110*a* is shown as mechanically supporting a first pair of radiating arms 112*a*, 112*b* in front of the reflector 102. Among other things, this first feed stalk 110*a* includes a first hook-shaped feed line 114*a*, which receives a corresponding cross-polarized feed signal, and a pair of serpentine inductors L1, L2 of a common mode filter, which extend adjacent outermost sides of the feed stalk 110*a*. In the event the first feed stalk 110*a* is configured as a dual-sided printed circuit board (PCB), the feed line 114*a* and inductors L1, L2 may be patterned on opposing "front" and "back" surfaces of the PCB along with other metallization (and metallized through-holes) to achieve proper matching.

Figure 6A:
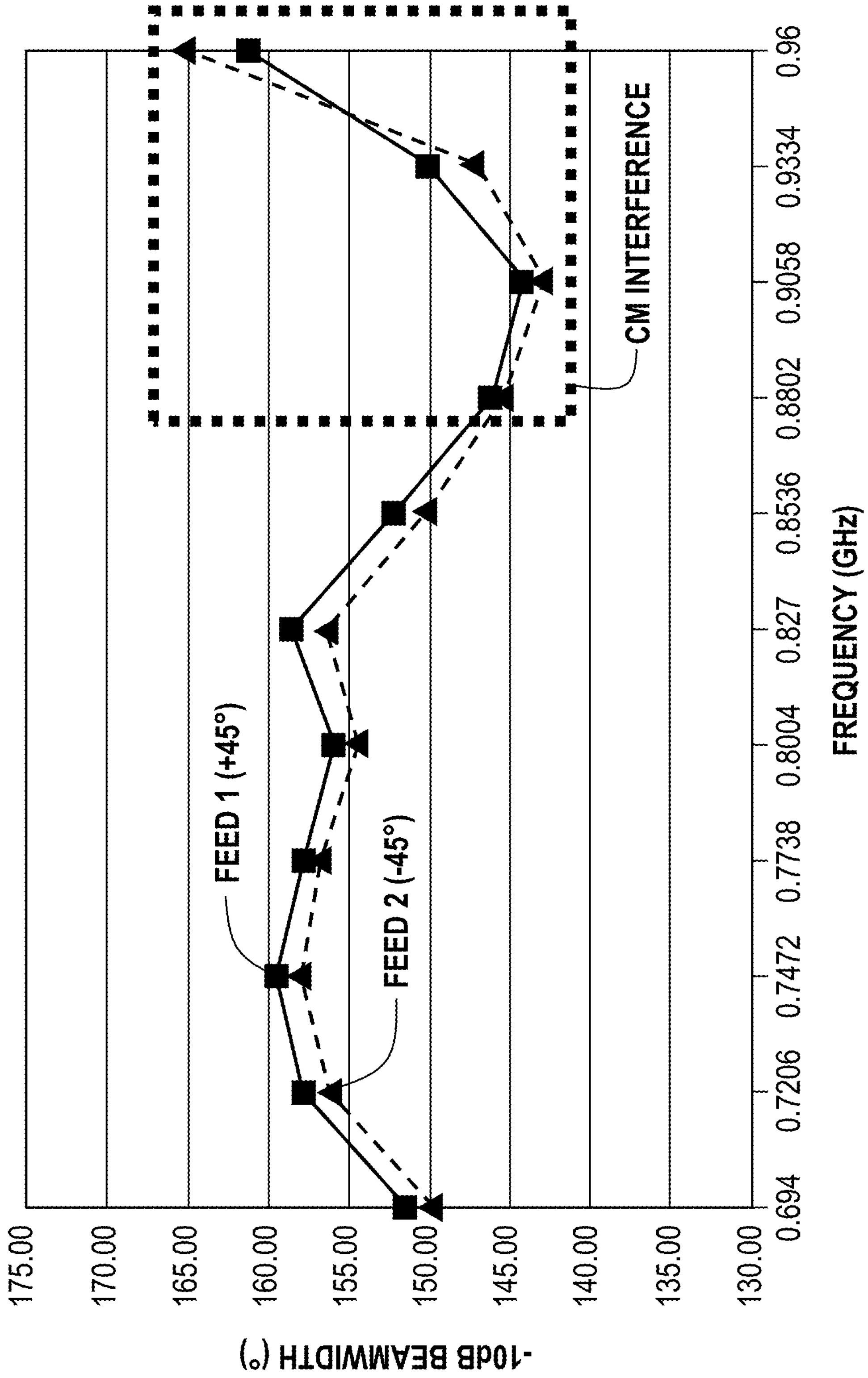
FIG. 6A is a graph of −10 dB beamwidth (in the azimuth plane) for the third cross-polarized dipole radiating elements of FIG. 5A.
Figure 6B:
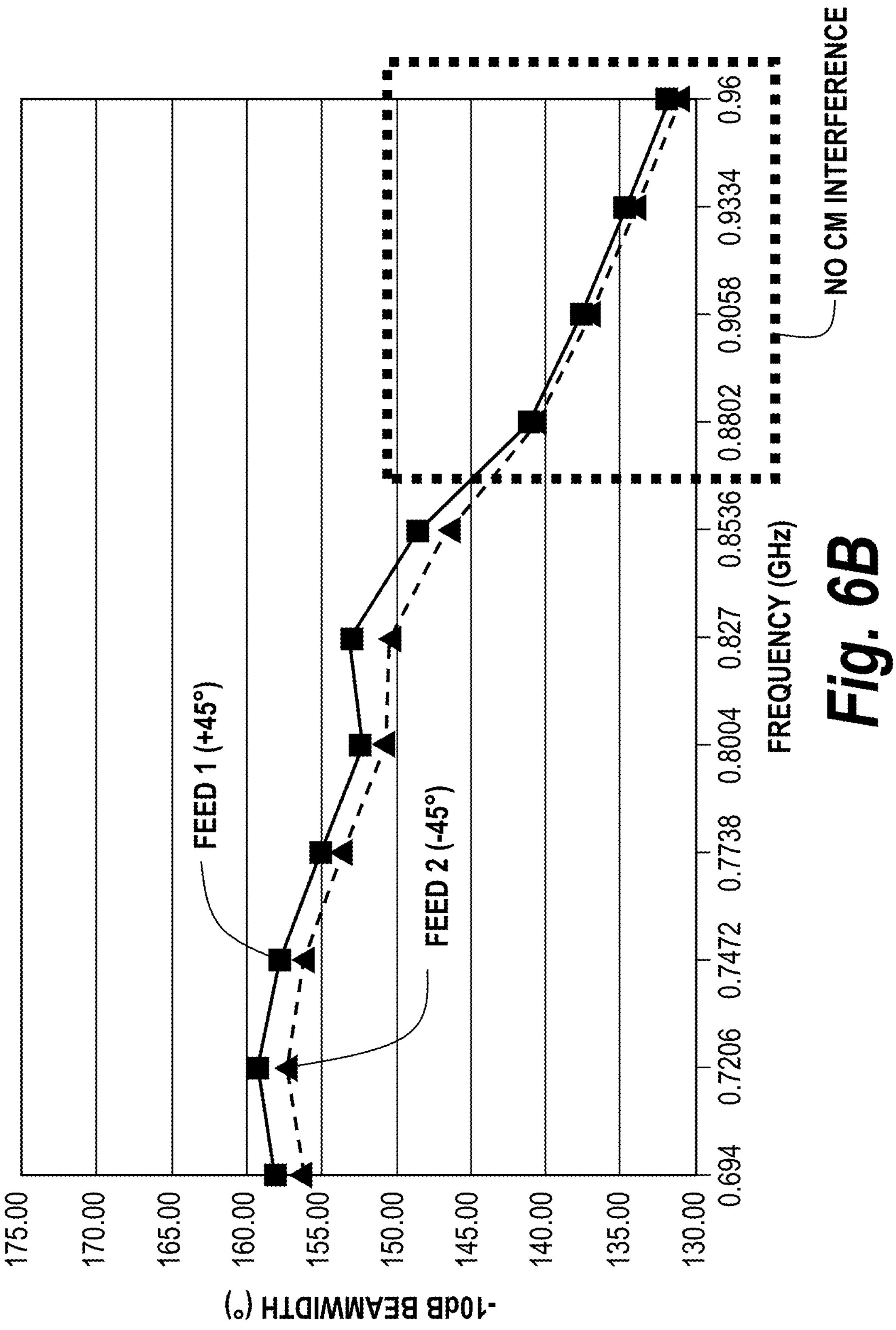
FIG. 6B is a graph of −10 dB beamwidth (in the azimuth plane) for the third cross-polarized dipole radiating elements of FIG. 5B.

Notwithstanding the configuration of the HB element 104 of FIGS. 5A and 5C, a relatively large increase in beamwidth of the LB elements 108 within the multi-band antenna 100*a* may still occur when all radiating elements 104, 106 and 108 are concurrently active in their respective frequency bands. For example, as shown by FIG. 6A, a graph of the −10 dB beamwidth (in the azimuth plane) for the third cross-polarized dipole radiating elements 108 of FIG. 5A demonstrates a dramatic and unacceptable widening of beamwidth at relatively high frequencies, particularly at frequencies above 950 MHz. But, this widening is not present when the LB elements 108 are operating in isolation (i.e., without HB elements 104, 106), as illustrated by the exclusively LB antenna 100*b* of FIG. 5B and corresponding −10 dB beamwidth graph of FIG. 6B.

Figure 7A:
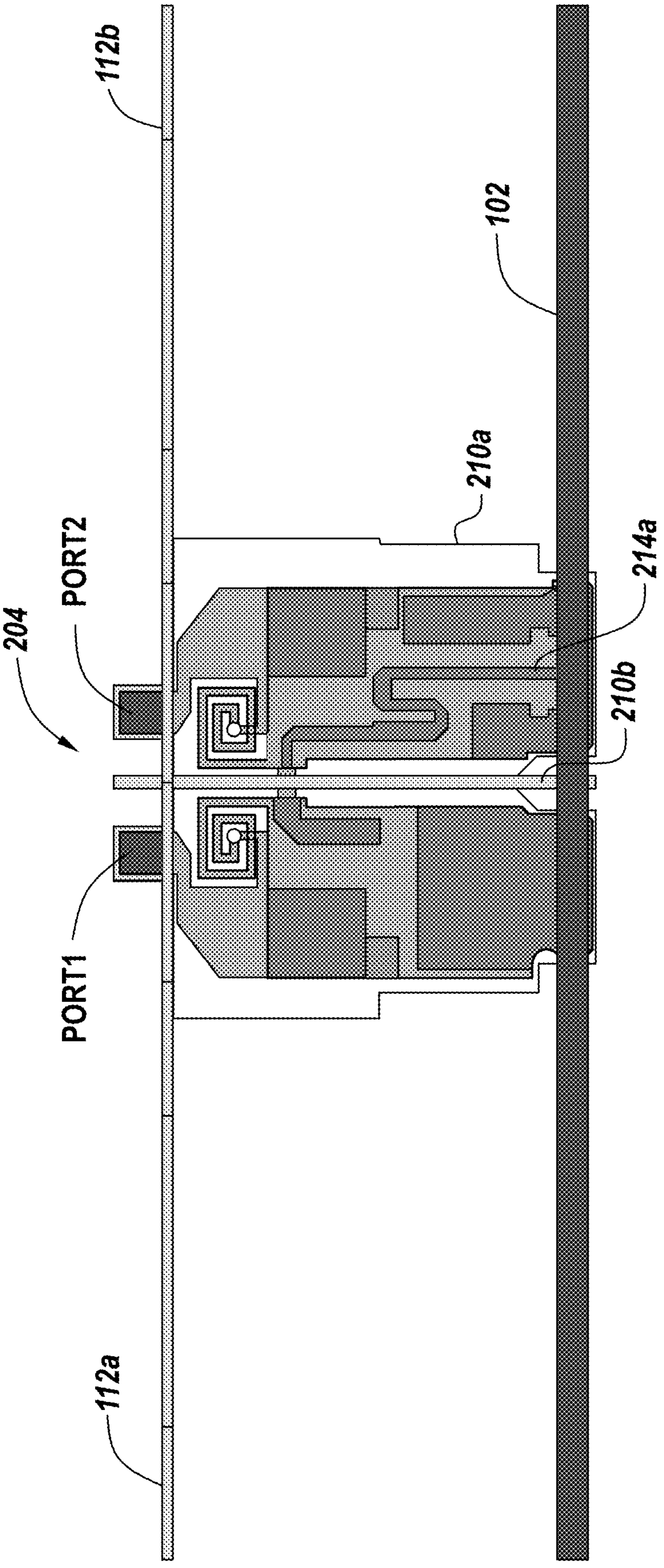
FIG. 7A is a side view of a cross-polarized dipole radiating element with first and second common-mode rejection filters embedded within respective first and second feed stalks (+45°, −45°), according to an embodiment of the invention.
Figure 7B:
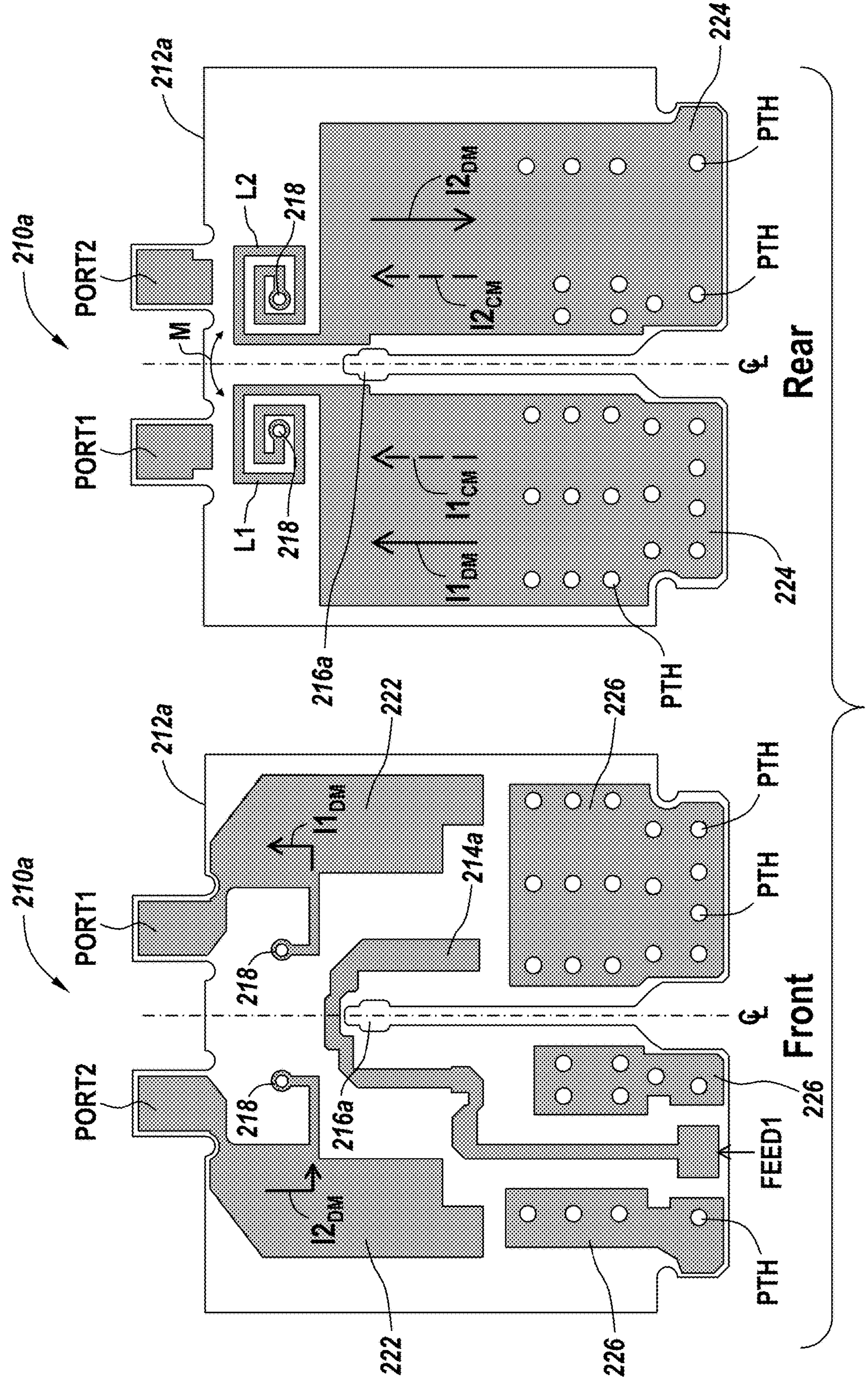
FIG. 7B includes front-side and back-side views of a first feed stalk within the radiating element of FIG. 7A, according to an embodiment of the invention.
Figure 7C:
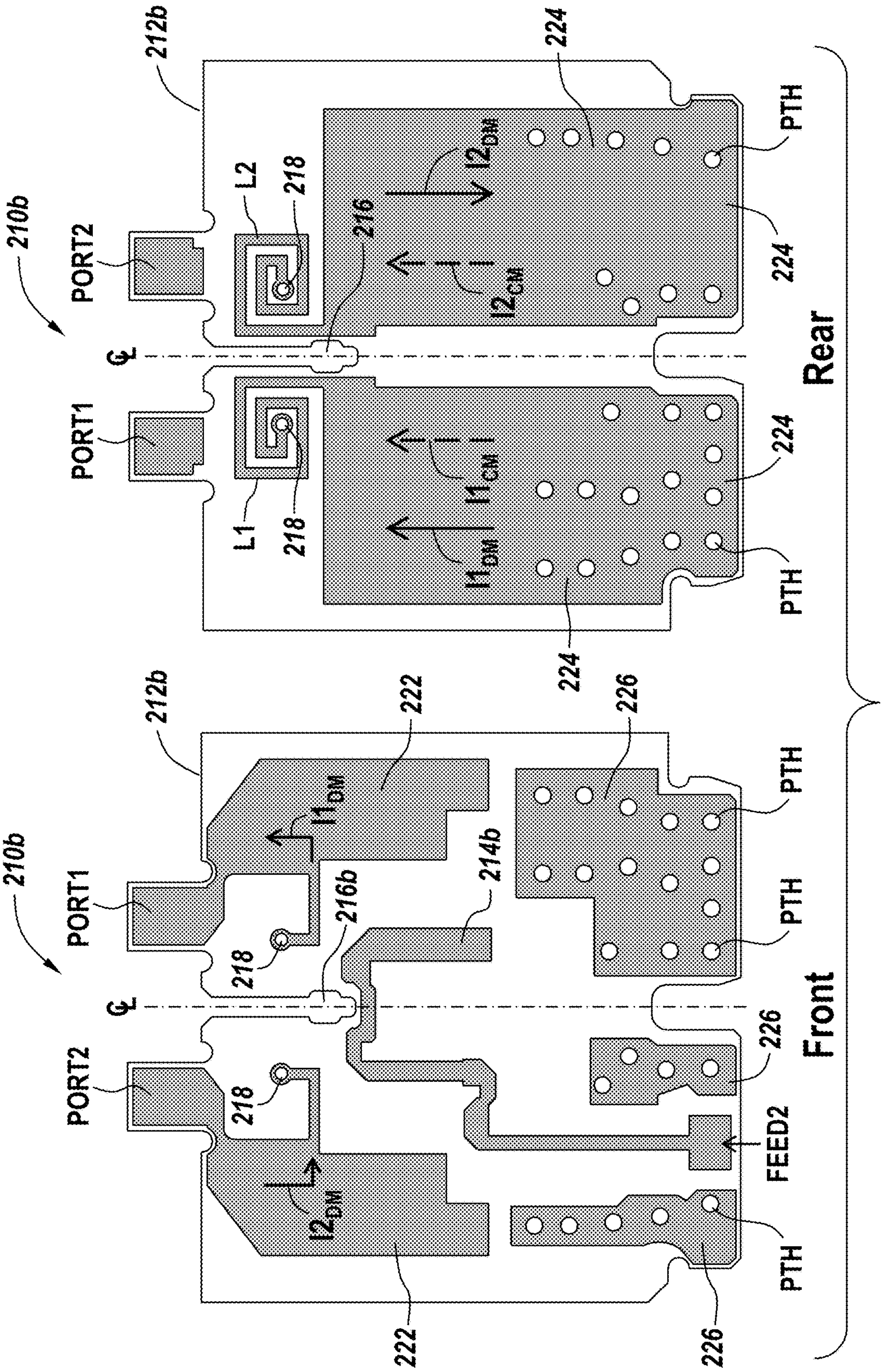
FIG. 7C includes front-side and back-side views of a first feed stalk within the radiating element of FIG. 7A, according to an embodiment of the invention.

To address this limitation associated with the HB element 104 of FIG. 5C, a cross-polarized dipole radiating element 204 is provided, which includes first and second feed stalks (+45°, −45°) having highly mutually coupled first and second common-mode rejection filters embedded therein. As shown by the embodiment of FIGS. 7A-7C, this HB radiating element 204 includes a pair of orthogonally interconnected first and second feed stalks 210*a*, 210*b*, which are mounted on a ground plane reflector 102 and receive respective feed signals (Feed1, Feed2) passing therethrough. These first and second feed stalks 210*a*, 210*b* are also collectively configured to mechanically support first and second pairs of dipole radiating arms thereon. As shown by the side view of FIG. 7A, the first feed stalk 210*a* is electrically coupled at first and second ports (Port1, Port2) to respective first and second radiating arms 112*a*, 112*b*.

This first feed stalk 210*a* is illustrated in greater detail by FIG. 7B, which shows front and rear side views of a double-sided printed circuit board 212*a* having metallization patterns thereon. In particular, a first hook-shaped feed line 214*a* is provided on the front side of the board 212*a*. The first feed line 214*a* is configured to receive a corresponding first feed signal (Feed1) at a base of the first board 212*a*, which, upon mounting, extends through the ground plane reflector 102. The first feed line 214*a* also extends across a centerline (C/L) of the first board 212*a*, and proximate a terminal end of a primary notch/slot 216*a*, as shown. The first feed stalk 210*a* also includes a pair of closely-spaced apart and equivalent spiral inductors $L_1$ and $L_2$ on a rear side of the board 212*a*. Advantageously, these spiral inductors $L_1$ and $L_2$ are configured to have a high degree of mutual inductive coupling (M) therebetween, which contributes to suppression of common-mode currents ($I1_{CM}$, $I2_{CM}$) within the first feed stalk 210*a*, which are induced therein in response to radiation received by the radiating element 204.

In particular, according to some embodiments of the invention, the shape and close spacing of the "mirror-image" spiral inductors $L_1$ and $L_2$ is sufficient to yield a relatively high mutual inductance M, such that a return loss associated with the suppressed first and second common mode currents $I1_{CM}$, $I2_{CM}$ is greater than −6 dB at an angular frequency ω, which corresponds to a frequency within a portion of a low-band that is typically outside the relatively high-band associated with the HB radiating element 204.

In addition, each of the counter-clockwise spiral inductor $L_1$ and clockwise spiral inductor $L_2$ terminate at respective plated through-holes 218, which provide electrically conductive paths to the first and second ports Port1, Port2 of the first feed stalk 210*a* and radiating arms 112*a*, 112*b*. As shown, these electrically conductive paths include generally equivalent metallization patterns 222 on the front side of the board 212*a*, which support opposing differential mode currents $I1_{DM}$, $I2_{DM}$ within the high-band during operation. The rear side of the board 212*a* also includes large area metal patterns 224, which support the differential mode currents $I1_{DM}$, $I2_{DM}$ across the feed stalk 210*a*. Each of these metal patterns 224 covers a majority of one-half of the rear side of the board 212, and is electrically coupled by a plurality of plated through-holes PTHs to corresponding metal patterns 226 on the front side of the board 212*a*.

Although not wishing to be bound by any theory, the illustrated overlap between the metal patterns 222 on the front side and the larger metal patterns 224 on the rear side of the board 212 provide coupling within a built-in impedance matching circuit provided by the first feed stalk 210*a*. In addition, the relatively large number of plated through-holes PTHs support the creation of a grounded coplanar waveguide structure, which can improve: (i) the isolation between both polarizations, (ii) the cross-pol radiation in the far-field, and (iii) the insertion loss.

Referring now to FIG. 7C, the second feed stalk 210*b* is similarly illustrated as including a printed circuit board 212*b* having a second hook-shaped feed line 214*b* on a front side thereof. The second feed line 214*b* is configured to receive a corresponding second feed signal (Feed2) at a base of the second board 212*b*, which extends through the ground plane reflector 102. The second feed line 214*b* also extends proximate a terminal end of a secondary notch/slot 216*b*, which mates with the primary notch/slot 216*a* in an orthogonal relationship upon assembly. The second feed stalk 210*b* includes a pair of closely-spaced apart spiral inductors L1 and L2 on a rear side of the board 212*b*. As described above with respect to FIG. 7B, these spiral inductors L1 and L2 are configured to have a high degree of mutual inductive coupling (M) therebetween, which contributes to suppression of common-mode currents ($I1_{CM}$, $I2_{CM}$) that are "induced" within the second feed stalk 210*b* in response to low-band radiation from an adjacent radiating element(s), such as the LB elements 108 of FIGS. 5A-5B.

As shown, each of the spiral inductors L1 and L2 terminate at respective plated through-holes 218, which provide electrically conductive paths to the first and second ports Port1, Port2 of the second feed stalk 210*b*. These electrically conductive paths include generally equivalent metallization patterns 222 on the front side of the board 212*b*, which support opposing differential mode currents $I1_{DM}$, $I2_{DM}$ during operation. The rear side of the board 212*b* also includes large area metal patterns 224, which support the differential mode currents $I1_{DM}$, $I2_{DM}$ across the feed stalk 210*b*. Each of these metal patterns 224 is electrically coupled by a plurality of plated through-holes PTHs to corresponding metal patterns 226 on the front side of the board 212*b*.

Figure 8:
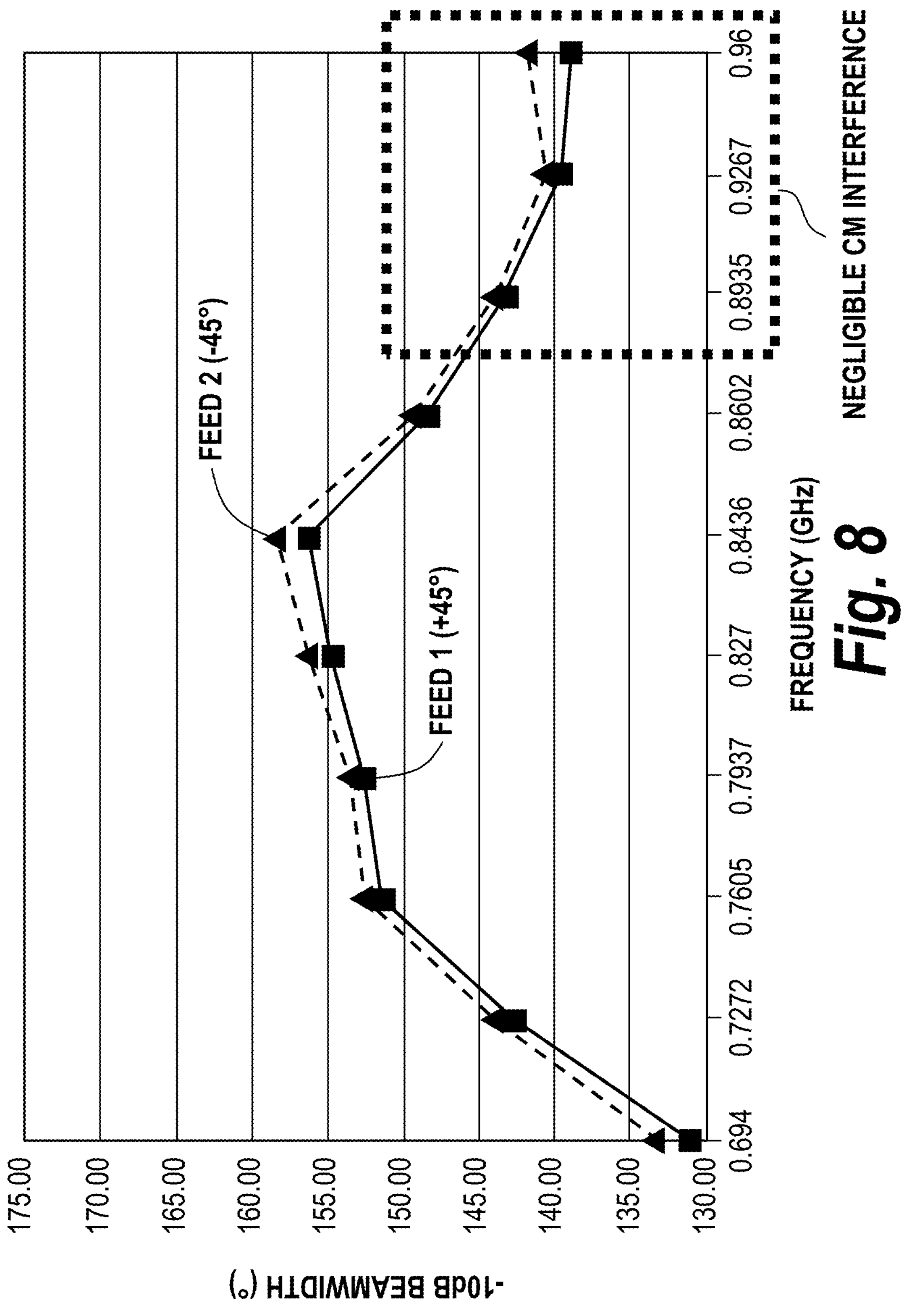
FIG. 8 is a graph of −10 dB beamwidth (in the azimuth plane) for the third cross-polarized dipole radiating elements of FIG. 5A, as modified by substituting the cross-polarized dipole radiating element of FIGS. 7A-7C for the second cross-polarized dipole radiating elements of FIG. 5C.

Referring now to FIG. 8, a graph of the −10 dB beamwidth (in the azimuth plane) for the third cross-dipole radiating elements of FIG. 5A is provided, which shows that a substantial improvement in common mode (CM) interference can be achieved by substituting the HB cross-dipole radiating element 204 of FIGS. 7A-7C for the second cross-dipole radiating elements 104 of FIG. 5C. Although not wishing to be bound by any theory, this high degree of suppression of CM interference is achieved in response to the shape and close spacing of the "mirror-image" spiral inductors $L_1$ and $L_2$ of FIGS. 7A-7C, which yield a relatively high mutual inductance M between $L_1$ and $L_2$. According to some embodiments of the invention, this mutual inductance is sufficiently high that a return loss associated with the suppressed common mode currents (see, e.g., $I1_{CM}$, $I2_{CM}$ in FIGS. 7B-7B) is greater than −6 dB at an angular frequency ω of operation, which may correspond to a frequency within a portion of a low-band that is typically outside the relatively high-band associated with the HB radiating element 204.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A radiating element, comprising:

a cross-dipole radiator; and first and second feed stalks, which are electrically coupled to said cross-dipole radiator and responsive to respective first and second radio frequency (RF) feed signals, said first and second feed stalks comprising respective first and second common-mode rejection (CMR) filters therein, said first CMR filter including a first impedance $Z_1=R_1+j\omega L_1+j\omega M(I_2/I_1)$ and a second impedance $Z_2=R_2+j\omega L_2+j\omega M(I_1/I_2)$, where $L_1$ and $L_2$ are the inductances of respective first and second inductors within the first feed stalk; $L_1 \approx L_2$, where the expression designates an equality within ±20%; $R_1$ and $R_2$ are the resistances of the first and second inductors; M is a mutual inductance between the first and second inductors; $I_1$ and $I_2$ are first and second common mode currents in the first feed stalk; ω is the angular frequency of the first and second common mode currents; and M is sufficiently close in magnitude to $L_1$ and $L_2$ that a return loss associated with the first and second common mode currents is greater than −6 dB at the angular frequency ω.

2. The radiating element of claim 1, wherein the first feed stalk comprises a doubled-sided printed circuit board having a pair of side-by-side inductors, as $L_1$ and $L_2$, on a first surface thereof, and a feed trace with a U-shaped feed segment on a second surface thereof.

3. The radiating element of claim 1, wherein the first feed stalk comprises a first doubled-sided printed circuit board having a pair of side-by-side inductors, as $L_1$ and $L_2$, on a first surface thereof, and a feed trace with a U-shaped feed segment on a second surface thereof; and wherein the second feed stalk comprises a second doubled-sided printed circuit board having a pair of side-by-side inductors on a first surface thereof, and a feed trace with a U-shaped feed segment on a second surface thereof.

4. The radiating element of claim 1, wherein the first and second feed stalks comprise respective first and second double-sided printed circuit boards having complementary grooves therein that interlock with each other.

5. The radiating element of claim 1, wherein the first and second inductors $L_1$ and $L_2$ are configured as first and second spiral inductors, respectively.

6. The radiating element of claim 5, wherein the first stalk comprises a double-sided printed circuit board (PCB); wherein the first and second spiral inductors are patterned on a first surface of the PCB; and wherein the first spiral inductor spirals inward in a counter-clockwise direction and the second spiral inductor spirals inward in a clockwise direction.

7. The radiating element of claim 2, wherein $L_1$ and $L_2$ are spiral inductors.

8. The radiating element of claim 7, wherein $L_1$ and $L_2$ are patterned as mirror images of each other relative to a center axis of the printed circuit board.

9. The radiating element of claim 8, wherein the first and second feed stalks comprise respective first and second double-sided printed circuit boards having complementary grooves therein that interlock with each other along the center axis.

10. A radiating element, comprising:

a radiator having first and second radiating arms; and a feed stalk having a common-mode rejection (CMR) filter therein, said CMR filter configured so that a first impedance therein, which is electrically coupled to the first radiating arm, is equivalent to $Z_1$, and a second impedance therein, which is electrically coupled to the second radiating arm, is equivalent to $Z_2$, where: $Z_1=R_1+j\omega_{L1}+j\omega M(I_2/I_1)$, $Z_2=R_2+j\omega L_2+j\omega M(I_1/I_2)$, $L_1 \approx L_2$; $R_1$ and $R_2$ are the resistances of a first inductor and a second inductor, respectively; $L_1$ and $L_2$ are the inductances of the first inductor and the second inductor, respectively; M is a mutual inductance between the first and second inductors; $I_1$ and $I_2$ are the first and second common mode currents in the first impedance and the second impedance, respectively; ω is the angular frequency of the first and second common mode currents; the expression "≈" designates an equality within ±25%; and M is sufficiently close in magnitude to $L_1$ and $L_2$ that a return loss associated with the first and second common mode currents is greater than −6 dB at the angular frequency ω.

11. The radiating element of claim 10, wherein the feed stalk comprises a dual-sided printed circuit board (PCB) having a hook-shaped feed line on a first surface thereof; and wherein the first and second inductors are configured as first and second spiral inductors on a second surface of the PCB.

12. The radiating element of claim 11, wherein the first inductor is electrically connected to the first radiating arm via a first metal trace on the first surface of the PCB, and the second inductor is electrically connected to the second radiating arm via a second metal trace on the first surface of the PCB.

13. An antenna, comprising:

a radiator including a plurality of radiating arms electrically coupled to a common-mode rejection (CMR) filter, said CMR filter configured to suppress common mode radiation from said radiator by providing a frequency dependent impedance to a pair of common mode currents within the plurality of radiating arms, which is sufficient to increase a return loss associated with the pair of common mode currents to a level of greater than −6 dB across a frequency range including a frequency of the common mode radiation.

14. The antenna of claim 13, wherein the CMR filter comprises a pair of spiral inductors.

15. The antenna of claim 13, wherein the frequency of the common mode radiation is less than a frequency of differential mode currents within the CMR filter when the antenna is active and responsive to: (i) at least a first RF feed signal at the frequency of the differential mode currents, and (ii) radiation from an adjacent radiator, which is responsive to at least a second RF feed signal at the frequency of the common mode radiation.

16. An antenna, comprising:

a reflector;

a first radiating element responsive to at least a first feed signal, on the reflector;

a second radiating element responsive to at least a second feed signal, on the reflector, said second radiating element comprising:

a radiator including a plurality of radiating arms electrically coupled to a common-mode rejection (CMR) filter, said CMR filter configured to suppress common mode radiation from said radiator by providing a frequency dependent impedance to a pair of common mode currents within the plurality of radiating arms, said frequency dependent impedance being sufficient to increase a return loss associated with the pair of common mode currents to a level of greater than −6 dB across a frequency range including a frequency of the common mode radiation.

17. The antenna of claim 16, wherein the pair of common mode currents are induced within the plurality of radiating arms in response to differential mode radiation from said first radiating element.

18. The antenna of claim 16, wherein said CMR filter comprises a pair of spiral inductors.

19. The antenna of claim 18, wherein a portion of a first of the pair of spiral inductors is separated from a portion of a second of the pair of spiral inductors by a dielectric material extending therebetween.

* * * * *